(12) United States Patent
Markiewicz

(10) Patent No.: US 7,649,720 B2
(45) Date of Patent: Jan. 19, 2010

(54) QUENCH PROTECTION OF HTS SUPERCONDUCTING MAGNETS

(75) Inventor: W. Denis Markiewicz, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 330 days.

(21) Appl. No.: 11/146,621

(22) Filed: Jun. 7, 2005

(65) Prior Publication Data

US 2006/0291112 A1    Dec. 28, 2006

Related U.S. Application Data

(60) Provisional application No. 60/678,857, filed on May 6, 2005.

(51) Int. Cl.
    *H02H 7/00*        (2006.01)
(52) U.S. Cl. ........................................ 361/19
(58) Field of Classification Search .................... 361/19
    See application file for complete search history.

(56) References Cited

U.S. PATENT DOCUMENTS

| | | | |
|---|---|---|---|
| 4,500,860 A | 2/1985 | Vermilyea | |
| 4,744,506 A | 5/1988 | Thornton | |
| 4,808,954 A | 2/1989 | Ito | |
| 4,895,831 A | 1/1990 | Laskaris | |
| 4,978,936 A | 12/1990 | Markiewicz et al. | |
| 5,552,211 A | 9/1996 | Ackermann et al. | |
| 5,581,220 A | 12/1996 | Rodenbush et al. | |
| 5,606,300 A | 2/1997 | Koyama et al. | |
| 5,627,709 A | 5/1997 | Salasoo | |
| 5,689,223 A | 11/1997 | Demarmels et al. | |
| 5,690,991 A | 11/1997 | Xu et al. | |
| 5,721,522 A | 2/1998 | Roth et al. | |
| 5,739,689 A | 4/1998 | Roth et al. | |
| 5,872,500 A | 2/1999 | Gore | |
| 5,884,489 A | 3/1999 | Retz et al. | |
| 5,900,792 A | 5/1999 | Havens et al. | |
| 5,917,393 A | 6/1999 | Kupiszewski et al. | |
| 6,081,987 A | 7/2000 | Kalsi et al. | |
| 6,147,844 A | 11/2000 | Huang et al. | |
| 6,355,993 B1 * | 3/2002 | Hazelton et al. | ............... 310/12 |
| 6,534,718 B1 | 3/2003 | Pourrahimi et al. | |
| 6,735,848 B1 | 5/2004 | Markiewicz et al. | |

(Continued)

OTHER PUBLICATIONS

Bromberg and Tekula, "Options for the Use of High Temperature Superconductor in Tokamak Fusion Reactor Designs," May 1999, Plasma Science and Fusion Center Massachusetts Institute of Technology.*

(Continued)

*Primary Examiner*—Stephen W Jackson
*Assistant Examiner*—Nicholas Ieva
(74) *Attorney, Agent, or Firm*—Senniger Powers LLP

(57) ABSTRACT

A method of constructing a superconducting coil. The method includes embedding a plurality of heater elements throughout a superconducting coil. The heater elements are positioned according to a predetermined distribution and substantially in thermal contact with the coil for heating the coil in response to a quench condition. Other aspects of the invention involve an active protection circuit and a high temperature superconductor magnet that includes such an active protection circuit for internally dissipating stored magnetic energy in the event of a quench.

23 Claims, 11 Drawing Sheets

U.S. PATENT DOCUMENTS 7,135,948 B2    11/2006    Markiewicz

OTHER PUBLICATIONS

Gupta, Aneralla, Cozzolino, Escallier, Ganetis, Ghosh, Harrison, Jain, Marone, Muratore, Parker, Sampson and Wanderer, "R&D for Accelerator Magnets with React and Wind High temperature Superconductors," Mar. 2002, IEEE Transactions on Applied Superconductivity, vol. 12, No. 1.*

Bascunan et al., "A 700 MHz LTS/HTS NMR Magnet—A Status Report," THA12PO07, manuscript received Sep. 20, 2005, 4 pages.

Ozaki et al., "Quench Analysis of Multisection Superconducting Magnet," IEEE Transactions on Applied Superconductivity, vol. 5, No. 2, Jun. 1995, pp. 483-486.

Eyssa et al., "Quench Simulation and Thermal Diffusion in Epoxy-Impregnated Magnet System," IEEE Transactions on Applied Superconductivity, vol. 5, No. 2, Jun. 1995, pp. 487-490.

Eyssa et al., Quench Heater Simulation for Protection of Superconductivity, vol. 9, No. 2, Jun. 1999, pp. 1117-1120.

Burkhardt et al., "Quench Protection Heater Studies of the 3rd 1-m Model Magnet for the KEK-LHC Low β Quadrupoles," IEEE Transactions on Applied Superconductivity, vol. 11, No. 1, Mar. 2001, pp. 1621-1624.

Nakamoto et al., Quench Protection Study of a Prototype for the LHC Low-Beta Quadrupole Magnets, IEEE Transactions on Applied Superconductivity, vol. 12, No. 1, Mar. 2002, pp. 170-173.

Weijers et al., "The Generation of 25.05 T Using a 5.11 T $Bi_2Sr_2CaCu_2O_x$ Superconducting Insert Magnet," Superconductor Science and Technology, 2004, pp. 636-644, Institute of Physics Publishing.

Iwasa, "Stability and Protection of Superconducting Magnets—A Discussion," Proceedings ASC 2004, 6 pages.

Iwasa, "Protection of HTS Magnets," Proceedings ISS2004, Nov. 2004, 14 pages.

Markiewicz, et al., "25 T High Resolution NMR Magnet Program and Technology," IEEE Trans. Magnetics, No. 4, pp. 2586-2589 (1996).

Markiewicz, et al., "Technology of 1 GHz NMR superconducting magnets," 216 Physica B, pp. 200-202 (1996).

Swenson, et al., "Development of Quench Protection Heaters for Superconducting Solenoids," 7 IEEE trans. Applied Superconductivity, No. 2, pp. 402-403 (1997).

Dixon, et al., "Mechanical Properties of Epoxy Impregnated Superconducting Solenoids," 32 IEEE Trans. Magnetics, No. 4, pp. 2917-2920 (1996).

Swenson, et al., "Quench Protection Heater Design for Superconducting Solenoids," 32 IEEE Trans. Magnetics, No. 4, pp. 2659-2662 (1996).

Eyssa, et al., "Quench, Thermal, and Magnetic Analysis Computer Code for Superconducting Solenoids," 7 IEEE Trans. Applied Superconductivity, No. 2, pp. 159-163 (1997).

Markiewicz, "1 GHz NMR spectroscopy: innovation in magnet technology," 9 Solid State Nuclear Magnetic Resonance, pp. 73-76 (1997).

Markiewicz, et al., "The Evolution of Adiabatically Stable Magnet Technology for High Field Nuclear Magnetic Resonance," High Magnetic Fields: Application, Generation, Materials, World Scientific, River Edge, NJ, pp. 287-295 (1997).

Dixon, et al., "Critical Current and n-Value of Nb3Sn Conductors for the Wide Bore 900 MHz NMR Magnet," 9 IEEE Trans. Applied Superconductivity, No. 2, pp. 2513-2516 (1999).

Swenson, et al., "Measurement of Thermal Contraction Properties for NbTi and Nb3Sn Composites," 7 IEEE Trans. Applied Superconductivity, No. 2, pp. 408-411 (1997).

* cited by examiner

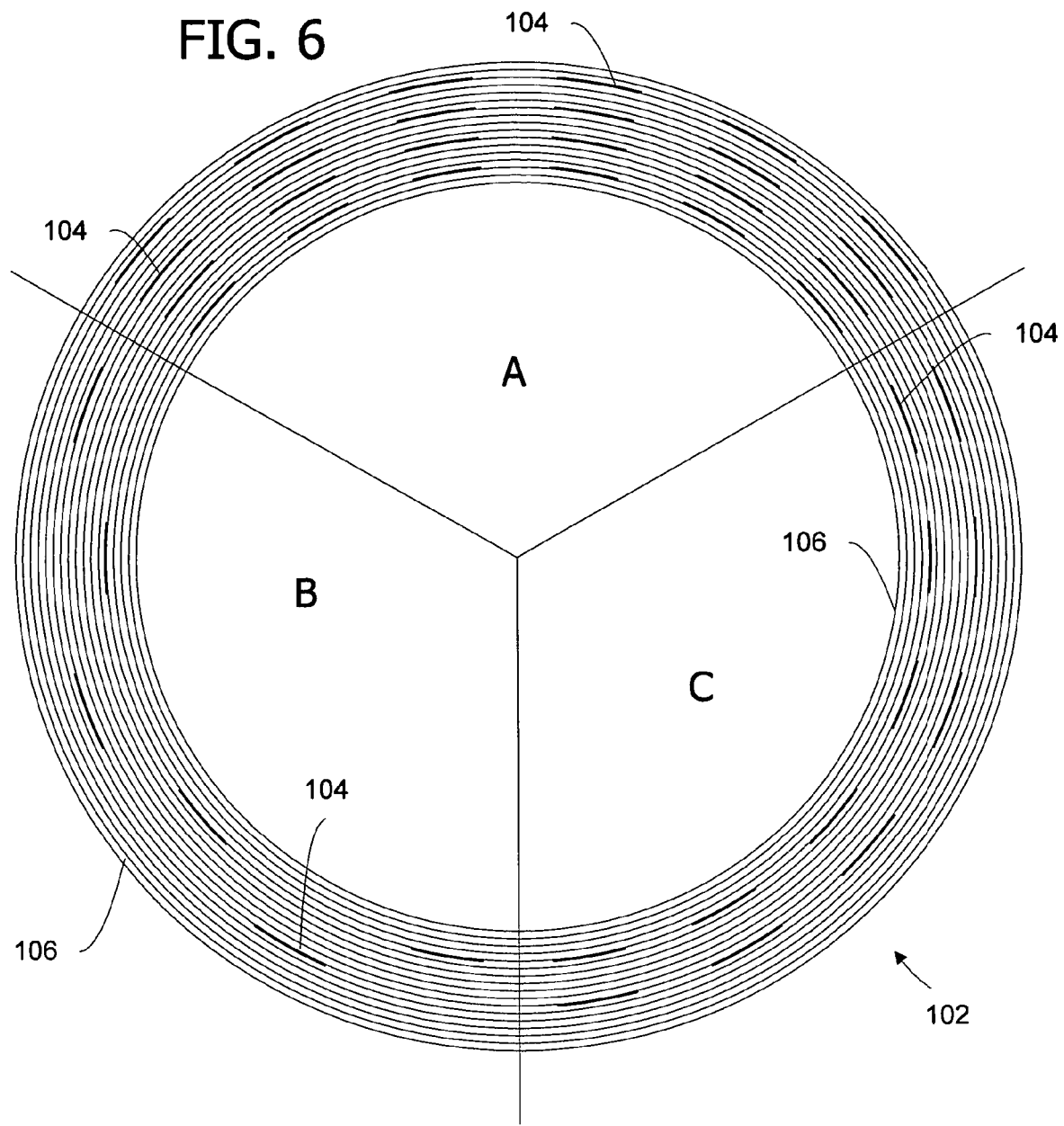

QUENCH PROTECTION OF HTS SUPERCONDUCTING MAGNETS

BACKGROUND OF THE INVENTION

The invention relates generally to superconducting magnets and, particularly, to quench protection of superconducting magnets.

In general, superconductors are composite materials in the form of wires or flat tapes (e.g., round or rectangular). The composite conductor typically includes copper or silver for protection and stabilization in addition to a superconducting alloy or compound. The composite conductor may also have substantial fractions of other materials (e.g., bronze). Known high temperature superconductors (HTS) operating at typical temperatures of less than about 80 K include, among others, BSCCO, YBCO, and $MgB_2$. Known low temperature superconductors (LTS) operating at typical temperatures of less than about 10 K include $Nb_3Sn$ and NbTi. A superconducting magnet often employs superconductors in a set of epoxy impregnated long solenoids.

Because superconducting magnets are often designed to produce high magnetic fields, they store relatively large amounts of magnetic energy during operation. Unfortunately, this stored energy may subject such a magnet to a mode of failure, known as "quench," in which the stored energy is suddenly converted into heat accompanied by the presence of large electrical voltages. A quench usually occurs when a conductor transitions from the superconducting state to the normal state in some region of one of the magnet coils. In the normal, non-superconducting state, the conductor has an increasingly large electrical resistance relative to the superconducting state and is heated by the current in the magnet.

A local dissipation of energy, for example, causes dissipation of the magnetic energy stored in the windings and leads to discharge of the magnet. Normal zone propagation, which is largely governed by the rate of thermal diffusion in solenoid wound coils, increases the size of the initial normal zone and dissipation of energy in this zone increases the temperature in the magnet. The temperature increase is governed by the resistivity and heat capacity of the windings. Also, the maximum temperature resulting from the quench depends on the initial current density and the discharge time.

The excess temperature and voltage in the windings caused by a quench condition can potentially damage the magnet. For example, when the stored magnetic energy is deposited over a limited volume of the magnet, the energy density and temperature can be high. A local resistance associated with a limited volume, and the increase in resistivity with temperature, can result in a localization of the resistive voltage in the windings of a magnet that is not balanced by the distributed inductive voltage during the discharge of the magnet. This leaves a relatively large physical voltage in the windings.

Although systems are known for protecting a superconducting magnet from damage due to a quench fault condition, improvements are desired. Typical magnet protection schemes aim to eliminate the potential adverse effects of high temperature and voltage during quench. Often, protection is achieved both through characteristics of the conductor in the magnet (e.g., by the addition of low resistivity stabilizer in a composite superconductor) and through characteristics of the overall circuit associated with the magnet (e.g., by extending normal zone volume in the magnet and rapidly discharging the stored energy).

With some superconducting magnets, it is possible to remove the stored energy from the coil using an external dump resistor and switch. When a quench detector senses a quench condition in the magnet, a protective circuit opens the switch to essentially create a series circuit of inductor and resistor. The magnet largely deposits its stored energy in the external resistor as it decays with a time constant characteristic of such circuits.

One alternative to removing the magnetic stored energy during a quench condition is to dissipate the energy internally to the magnet windings. A quench is usually a local phenomenon and, thus, the energy will dissipate locally. In this instance, the local region will overheat and be damaged if enough energy is available in the magnet. Distributing the energy somewhat uniformly over the entire volume of the magnet will help prevent overheating any one portion of the windings. Conventional protection systems are available for distributing the stored energy in the magnet. The particular type of system used depends on the type of magnet involved.

Conventional quench protection systems are usually classified as active or passive, and as external or internal. In addition, these protection systems are classified by whether they do or do not contain protection heaters. A simple active protection circuit consists of a room temperature circuit breaker switch in series with the magnet power supply, and an external dump resistor, as shown in FIG. 1. Such an active system also requires a quench detector to recognize the presence of a quench condition and to open the switch. FIG. 2 illustrates a simple passive protection circuit, which consists of a subdivision of the magnet windings into distinct coils accessible to a shunt loop containing a resistor or a combination of a resistor and a series diode. Such a passive system generally responds to the conditions that result from a quench, namely, the rise in resistance locally in a coil, to prevent excessive temperature and voltage in the windings.

Conventional quench protection systems are sometimes more complicated. For example, in an active system such as the one illustrated in FIG. 3A or FIG. 3B, a quench detector activates an external heater power supply to energize a heater that is in thermal contact with the coil windings. This system is commonly used on LTS accelerator magnets with limited numbers and distribution of heaters. In a variation of this system, as shown in FIGS. 4A and 4B, the external heater power supply activates a heater in a secondary persistent switch included in the magnet circuit, driving the switch normal and resistive, and forcing a portion of the magnet current to flow in a parallel circuit of resistive heaters that are in thermal contact with the magnet. The active protection system of FIGS. 4A and 4B, is commonly used on LTS high field NMR magnets with heaters placed on the outside surface of the windings of each coil.

Similar arrangements can be configured as a passive systems, as shown in FIG. 5A and FIG. 5B, by using the voltage that develops across the coil, or preferably across the coil section containing the initial normal zone, to power the heater in the persistent switch. When the switch goes normal, the magnet current flows in the parallel heaters located on the outside surface of the windings.

Unfortunately, the existing quench protection systems are generally limited to LTS magnets. As such, the protection heaters used in the prior art that are in good thermal contact with the coil windings are designed to be consistent with the behavior and protection requirements of LTS magnets. Because the normal zone propagation rate is typically rapid in LTS coils, the protection heaters need only be few in number and are typically placed on the outside surface of coil windings. The normal zone created by such heaters spreads rapidly in low temperature superconductors to encompass an extended volume of the windings and thereby serves the purposes of quench protection. But such conventional protection systems are inadequate for use in HTS magnets, which have a much slower normal zone propagation rate.

High temperature superconductors are characterized by high critical temperatures and high critical fields. The high critical temperature allows for operation of HTS coils at relatively high temperatures compared to LTS coils. For example, coils containing YBCO superconductor are expected to operate in a range of cryogenic nitrogen, 65 K to 77 K. At these temperatures, the heat capacity of materials is very large compared to the heat capacity near liquid helium temperatures (e.g., 4 K). In addition, when HTS conductors such as those containing BSCCO or $MgB_2$ are used at liquid helium temperatures, the high critical field allows for operation of magnets at values of field exceeding those possible with LTS conductors, while still having a critical temperature far greater than that of LTS conductors. High heat capacity and large temperature margins below critical temperature result in a high stability of the magnet against thermal disturbances because of the large energy necessary to create an initial normal zone. Although less likely than in an LTS coil, quench is still a possibility in an HTS coil. Sources of excess local temperature to initiate quench may arise from a failure of the cryogenic system to maintain the low temperature and from ac loss heating of the windings. Furthermore, when an HTS coil is used in a magnet containing additional LTS coils, the HTS coil must be protected against the effects of a quench in any coil in the magnet. Given the potential for a quench, quench protection of the magnet is required to assure equipment safety.

The increased stability of HTS coils makes quench protection more difficult once a quench does occur. The relatively high heat capacity and temperature margin of HTS coils compared to LTS coils result in a low rate of normal zone propagation. The lack of rapid normal zone propagation is a dominant factor in the design of protection of HTS coils.

Some currently available quench protection systems, such as active protection with an external dump resistor (see FIG. 1), do not depend on the rate of normal zone propagation. The operation of a typical active protection system with external energy dump requires a discharge voltage, for a given decay time constant, that is proportional to the stored energy of the magnet and inversely proportional to the operating current of the magnet. Typically, external energy dumps are used with large magnets of high stored energy and high operating current. At low operating current, the required discharge voltage is excessively high for the dielectric design of such magnets. Even with reduced stored energy in relatively small coils, the discharge voltage can be significant (e.g., on the order of 1000 volts). The discharge voltage is common to the dump resistor, the switch that opens the circuit, and the magnet, as shown in FIG. 1. The high switch voltage results in complexity, size, and weight in the switch. High voltage discharge has practical limitations and also places constraints on the dielectric design of the magnet coils. Those skilled in the art are familiar with the use of an external energy discharge at high voltage in an attempt to protect an HTS insert coil operating in a test mode in the large bore of an outer test coil. Nevertheless, a conventional external dump resistor protection system is not well suited for the protection of coils operating at relatively low current, as is typical with HTS coils.

Passive protection systems that internally deposit stored magnetic energy are common for LTS coils with relatively low current and low stored energy, and are increasingly being applied to LTS coils of low current and higher stored energy. Passive protection systems, such as shown in FIG. 2, generally rely on the rapid growth of normal zone resistance for transferring inductive energy among the coils. In this instance, the inductive energy transfer results from a growth in the resistance of a coil that is well coupled by mutual inductance to neighboring coils. Those skilled in the art are familiar with a stand alone developmental HTS coil for a gyrotron application that used a passive circuit with shunts. For the gyrotron application, the resistive shunts were external to the windings of the coil and high thermal conductivity sheets of copper were distributed in the windings and thermally connected to the shunts as a way to distribute the heat deposited in the shunts throughout the coil. The lack of fast resistive growth in HTS coils makes such systems ineffective, as well as any other system that depends for its operation on the rapid increase of resistance and voltage. Therefore, passive protection systems provide inadequate quench protection for HTS coils.

Although active protection systems that dissipate energy internally have been used on LTS coils, the heater configurations associated with such systems are limited to a relatively small number of heaters placed largely on the outside surface of the windings. Unfortunately, distributing heaters in this manner fails to effectively protect of HTS coils from quench conditions because of the lack of normal zone propagation from the surface of the windings through the volume of the coils.

Commonly assigned U.S. Pat. No. 6,735,848, the entire disclosure of which is incorporated herein by reference, discloses a superconducting magnet employing an active quench protection circuit.

In light of the foregoing, improvements are desired in the protection of superconducting magnets, especially those containing HTS coils.

SUMMARY OF THE INVENTION

Embodiments of the invention overcome one or more deficiencies in the prior art by providing improved active protection of superconducting coils during quench. Aspects of the invention address the lack of rapid normal zone propagation, which is a fundamental difficulty in the quench protection of HTS coils and, thus, are particularly well suited to protection of such coils. Advantageously, a multiplicity of heaters distributed throughout the windings of a superconducting coil permits the distribution of normal regions during quench without relying on a rapid natural propagation of the normal zone by the conductor. The construction of coils with distributed heaters according to the invention may be applied to various coil configurations, including, but not limited to, pancake wound coils, layer wound coils, solenoids, and racetrack coils. Moreover, the present invention contemplates use with a number of different active circuits to provide effective quench protection. Further aspects of the invention eliminate the need for a separate heater power supply in the protection circuit and eliminate the need for a secondary persistent switch. In one embodiment, the invention lowers the circuit breaker switch voltage needed with conventional circuits that discharge energy externally. The decreased voltage reduces the requirements on the circuit breaker switch and reduces the insulation dielectric requirements for the design and construction of the superconducting coil.

A method of constructing a superconducting coil embodying aspects of the invention includes winding at least one coil of superconductor and distributing a plurality of heater elements substantially uniformly throughout the coil. The heater elements are positioned substantially in thermal contact with the coil for heating the coil in response to a quench condition substantially independent of normal zone propagation of the superconductor. The heater elements are energized in response to the quench condition (e.g., by magnetic energy stored in the coil or a separate power supply). The method also includes cooling the coil and heating elements to an operating temperature less than approximately 80 K.

Aspects of the invention also involve an active quench protection system for a superconducting coil. The system includes at least one coil of high temperature superconductor (HTS) and a quench detector for detecting a quench condition in the coil. The system also includes a plurality of heater elements distributed substantially uniformly throughout the coil. The heater elements are positioned substantially in thermal contact with the coil for heating the coil in response to the detected quench condition substantially independent of normal zone propagation of the HTS. The heater elements are energized in response to the quench condition to internally dissipate the magnetic energy.

Yet another aspect of the invention is a superconducting magnet that includes at least one coil of high temperature superconductor (HTS). The magnet has an active protection circuit for protecting the coil in response to a quench condition in the magnet. The protection circuit includes a quench detector for detecting the quench condition and a plurality of heater elements distributed substantially uniformly throughout the coil. The heater elements are positioned substantially in thermal contact with the coil for heating the coil in response to the detected quench condition substantially independent of normal zone propagation of the HTS. The magnet also includes a power supply for charging the coil, which stores magnetic energy therein when charged. In response to the quench condition, the heater elements are energized to internally dissipate the magnetic energy. The magnet also includes a cold space for maintaining the coil at an operating temperature less than approximately 80 K.

Alternatively, embodiments of the invention may comprise various other methods and apparatuses.

Other features will be in part apparent and in part pointed out hereinafter.

BRIEF DESCRIPTION OF THE DRAWINGS

FIG. 6 is a top plan view of layer wound superconducting coils having distributed internal heater elements according to embodiments of the invention.

Corresponding reference characters indicate corresponding parts throughout the drawings.

DETAILED DESCRIPTION OF THE INVENTION

Figure 7:
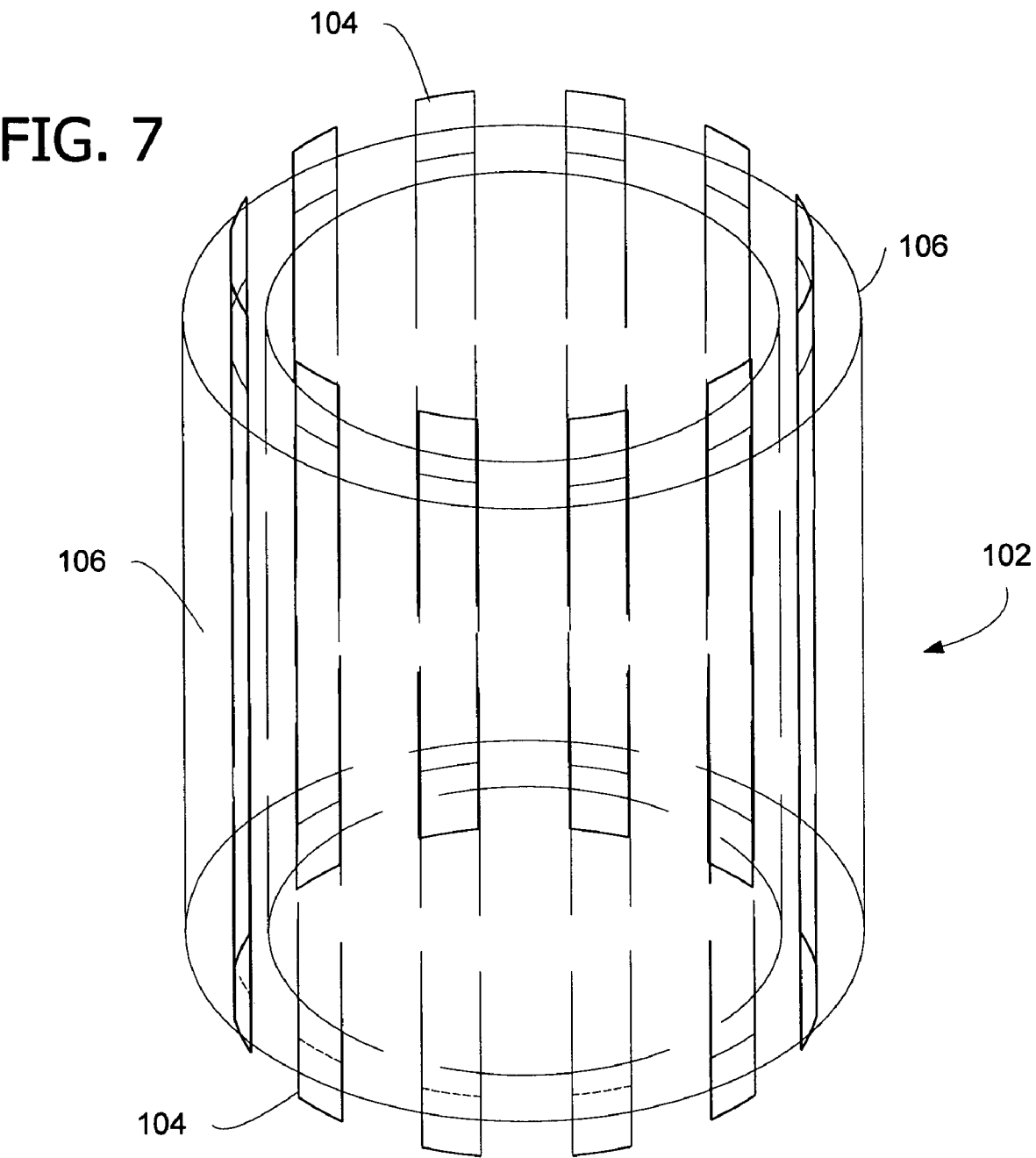
FIG. 7 is a fragmentary perspective view of a magnet having layer wound superconducting coils and distributed internal heater elements according to embodiments of the invention.

Referring now to the drawings, aspects of the invention involve constructing a superconducting magnet 102, as shown in FIGS. 6 and 7. In the illustrated embodiment, numerous heater elements 104 are distributed throughout one or more windings 106 of superconducting material. The heaters 104 may be used in a number of different overall magnet circuits such that when the magnet 102 experiences a quench, heaters 104 are activated, and the resultant heat drives adjacent windings 106 from a superconducting state into a normal state. Advantageously, the distribution of a relatively large number of heaters 104 throughout windings 106 causes a significant fraction of the total volume of windings 106 to be driven normal. Moreover, the distribution of heaters 104 as contemplated by the invention results in the distribution of these normal regions without the benefit of, or reliance on, a rapid natural propagation of the normal zone by the conductor. As described below, the construction of coils with distributed heaters may be applied to various coil configurations, including pancake wound coils (see FIGS. 9 and 10) and to layer wound coils (see FIGS. 6 and 7).

Figure 12A:
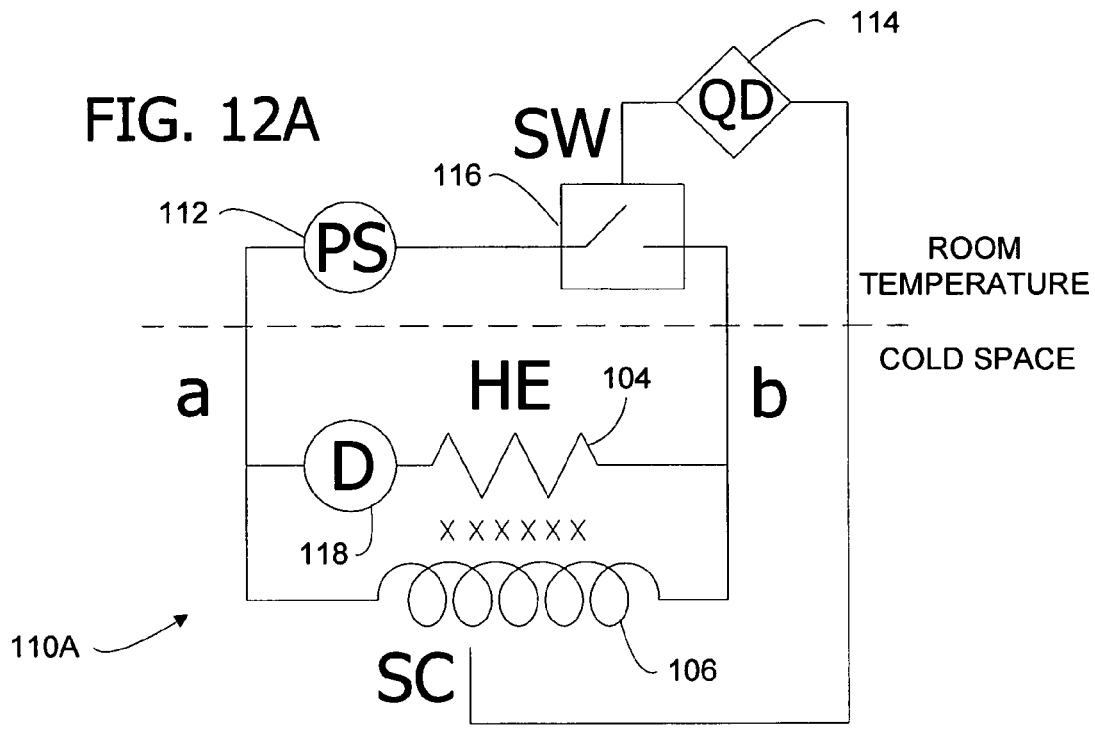
FIGS. 12A and 12B are schematic diagrams of exemplary active protection circuits according to embodiments of the present invention.
Figure 12B:
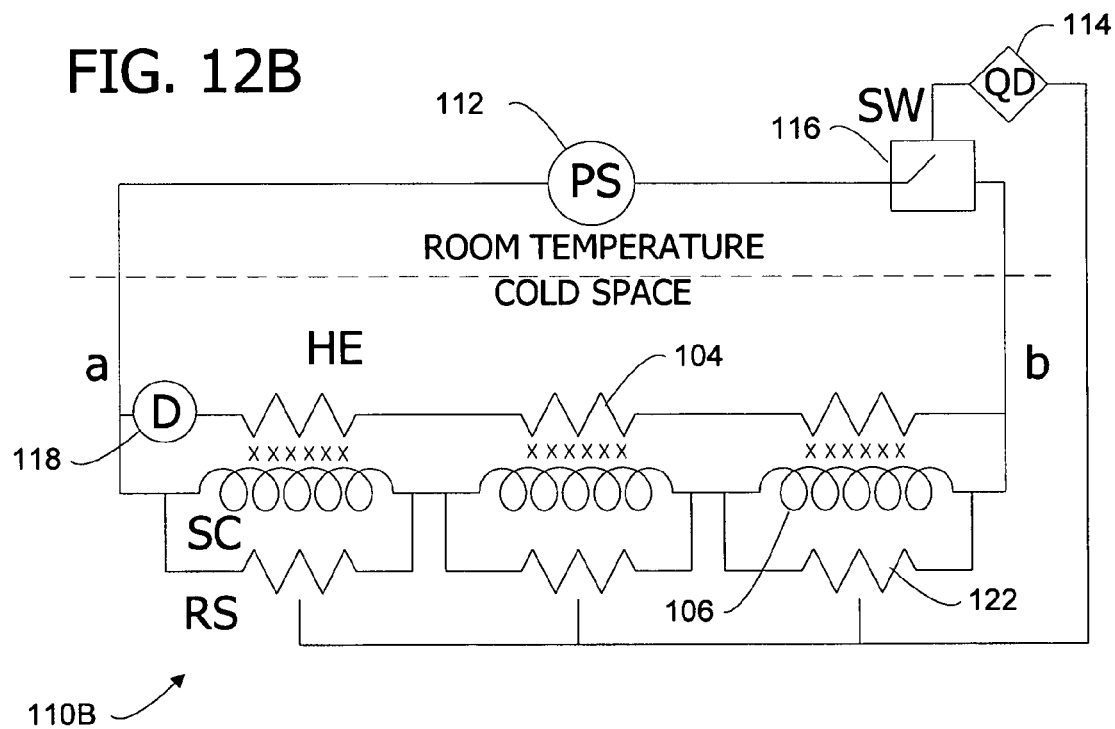

Also as described below, additional aspects of the invention relate to a magnet circuit, such as shown in FIG. 12A or FIG. 12B, that combines active quench detection, a circuit breaker switch, and distributed heaters connected to the magnet. In these circuits, the heaters are powered by the stored energy of the magnet, eliminating the need for separate power supplies. The use of an external circuit breaker switch eliminates the need for secondary protection persistent switches as used in the prior art of FIGS. 4A and 4B and FIGS. 5A and 5B. Also, employing an internal dissipation of energy in coils permits a lower circuit breaker switch voltage than is characteristic of the external energy discharge of the prior art circuit shown in, for example, FIG. 1. The decreased voltage beneficially reduces the requirements on the circuit breaker switch and reduces the insulation dielectric requirements for the design and construction of the superconducting coil.

Referring again to FIGS. 6 and 7, one embodiment of the invention relates to constructing a layer wound coil containing a multiplicity of distributed heaters 104. In this instance, magnet 102 comprises one or more layer wound coils, i.e., windings 106 of FIGS. 6 and 7. A layer wound coil is usually spiral wound in layers from wire or tape and the layers may extend the full length of the coil. Successive layers build radially to form the depth of the magnet's windings 106. In this instance, each of the heaters 104 is formed of thin strips of resistive conductor, such as steel. The strips are thin, on the order of 0.05 mm or less, to take limited space in windings 106. The heaters 104 are placed between layers of the windings 106 around the circumference of a cylindrical layer and extend along the entire length. Embodiments of the invention include the possibility of different distributions of heaters 104 within a layer and within the various layers of windings 106.

For purposes of illustration, three alternative exemplary distributions are shown in segments A, B, and C of an end view of a coil in FIG. 6. Each of the segments A, B, and C show a different distribution of heaters 104 about the circumference of a layer, and among the various layers. The distributions show various densities of heater per unit volume of the windings 106. In the limiting case of no normal zone propagation, a high density of heaters is desired. In the case of a finite normal zone propagation velocity that is characteristic of the coil due to operating conditions or measures taken to improve the normal zone propagation for a particular conductor or coil construction, a decreased density of the multiplicity of distributed heaters 104 is desired.

Figure 8:
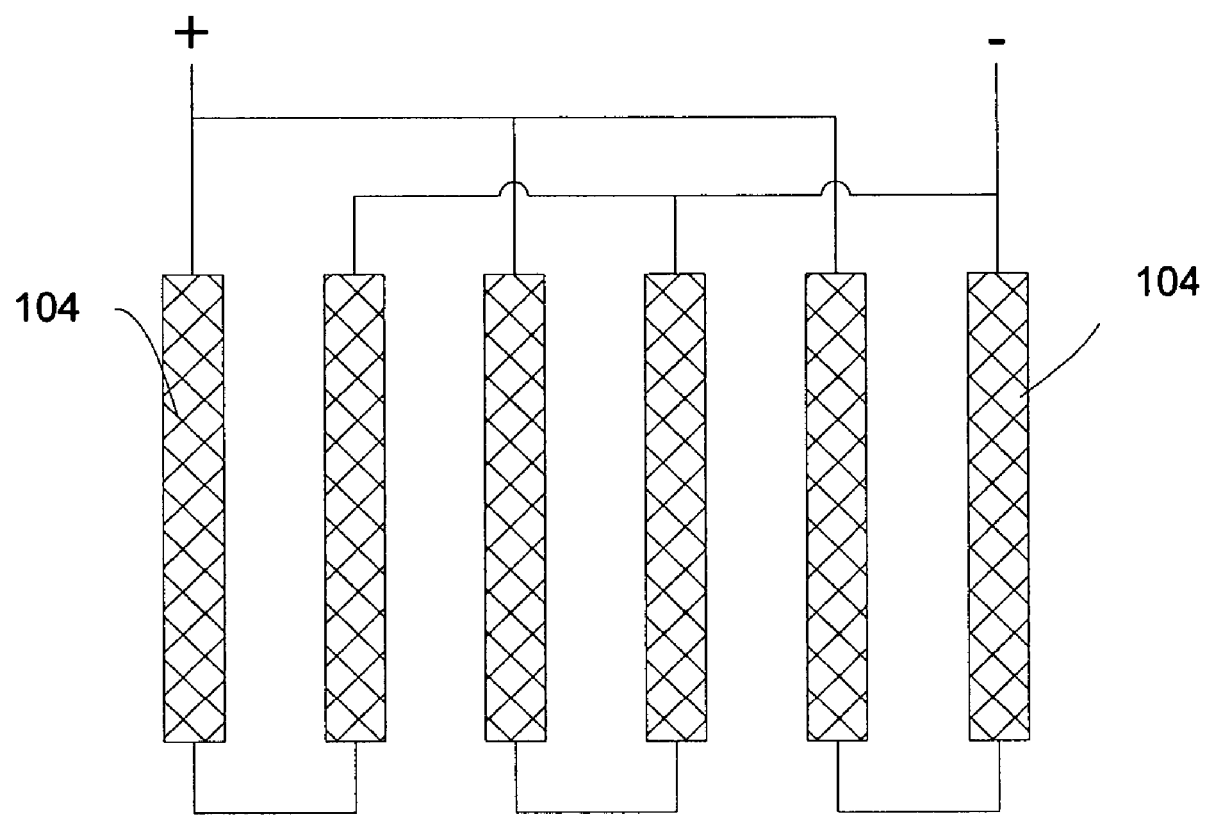
FIG. 8 is a schematic diagram of heater elements for use in the superconducting coils of FIGS. 6 and 7.

The heaters 104 preferably extend the full length of the coil and beyond, as shown in FIG. 7. In this instance, the length of windings 106 determines the heater strip length. The width of each heater 104 may be determined from analysis described below. The full width may be divided into any number of parallel strips for convenience of construction, and then connected in parallel electrically (see FIG. 8) to give effectively the desired full heater width. Heater 104 may be the entire length of windings 106 or connected in series to form some multiple (e.g., 2) of the length of windings 106 to facilitate electrical connections at one end of magnet 102. In one embodiment, heaters 104 are placed individually on a layer during winding of the superconductor coil. In an alternative embodiment, heaters 104 are part of an assembly that fixes the separation of the heater strips. As heaters 104 are positioned on a layer of the layer wound coil, insulation may be placed about them. Additional layers of windings 106 are then wound over heaters 104 followed by subsequent sets of heater strips. In the embodiment of FIG. 8, heaters 104 are electrically connected in the series and parallel combination to provide a specified overall width and length of distributed heating for the layer.

Figure 9:
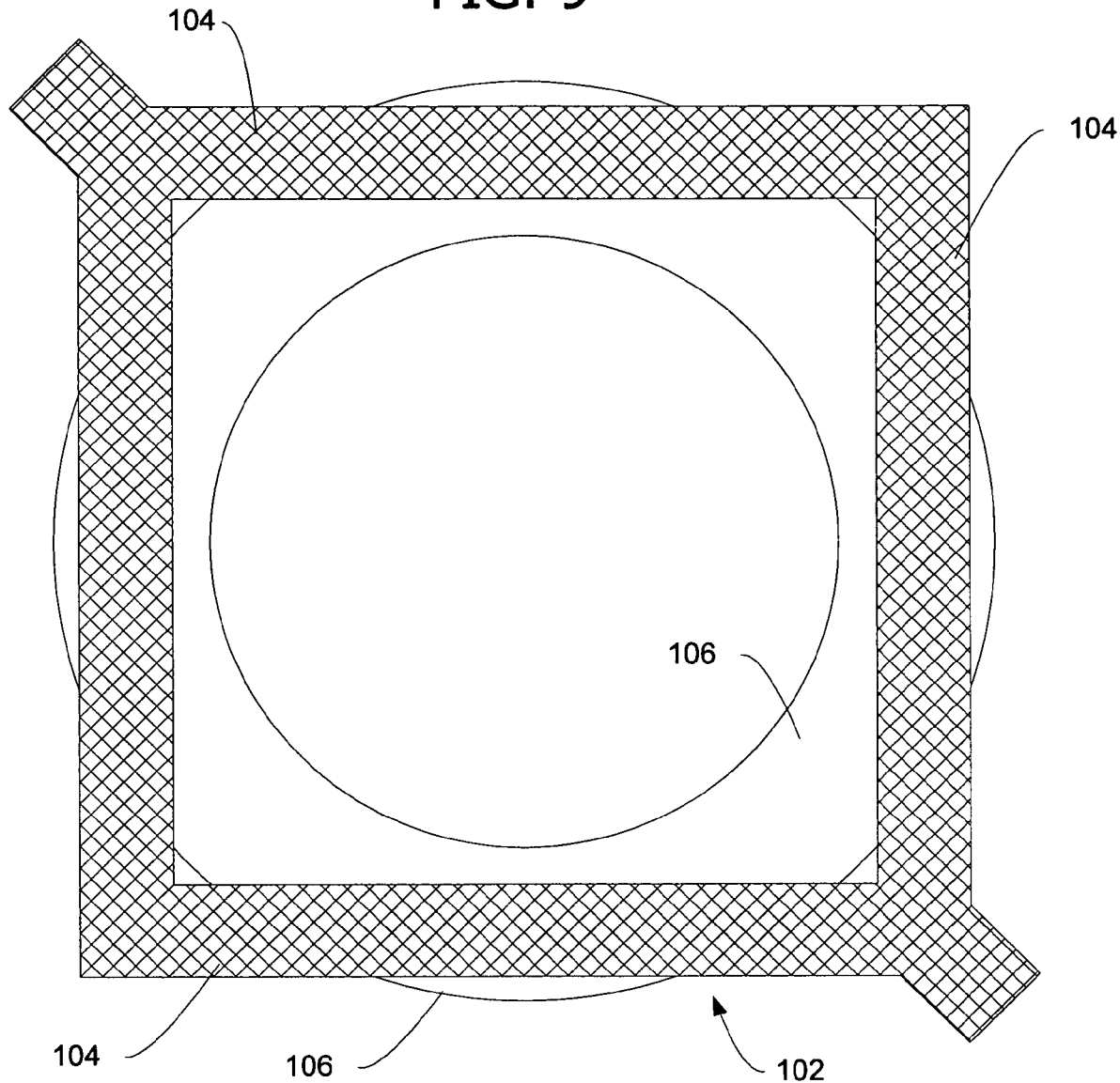
FIG. 9 is a top plan view of a pancake wound superconducting coil having distributed internal heater elements according to embodiments of the invention.
Figure 10:
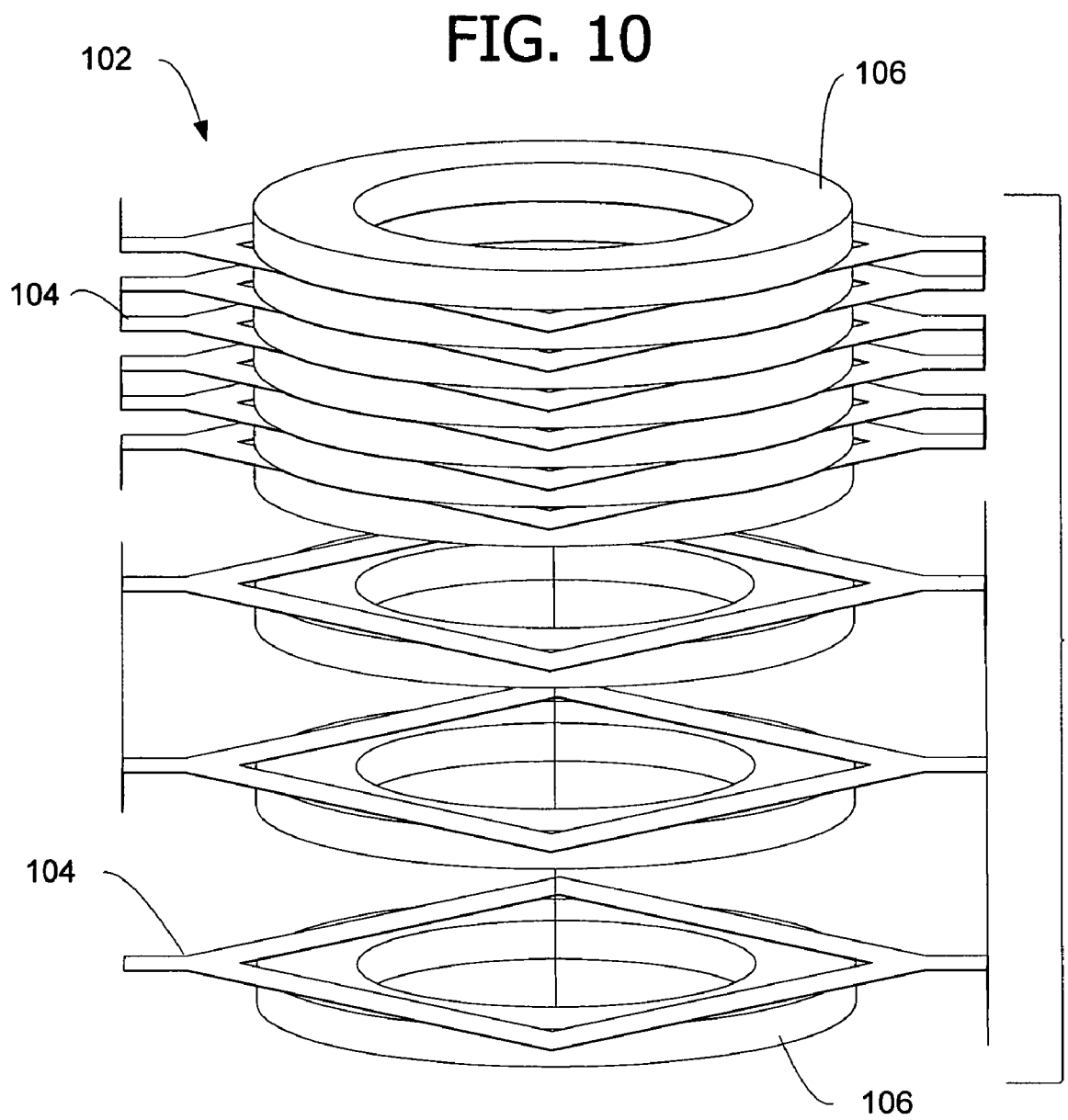
FIG. 10 is an exploded perspective view of a magnet having pancake wound superconducting coils and distributed internal heater elements according to embodiments of the invention.
Figure 11:
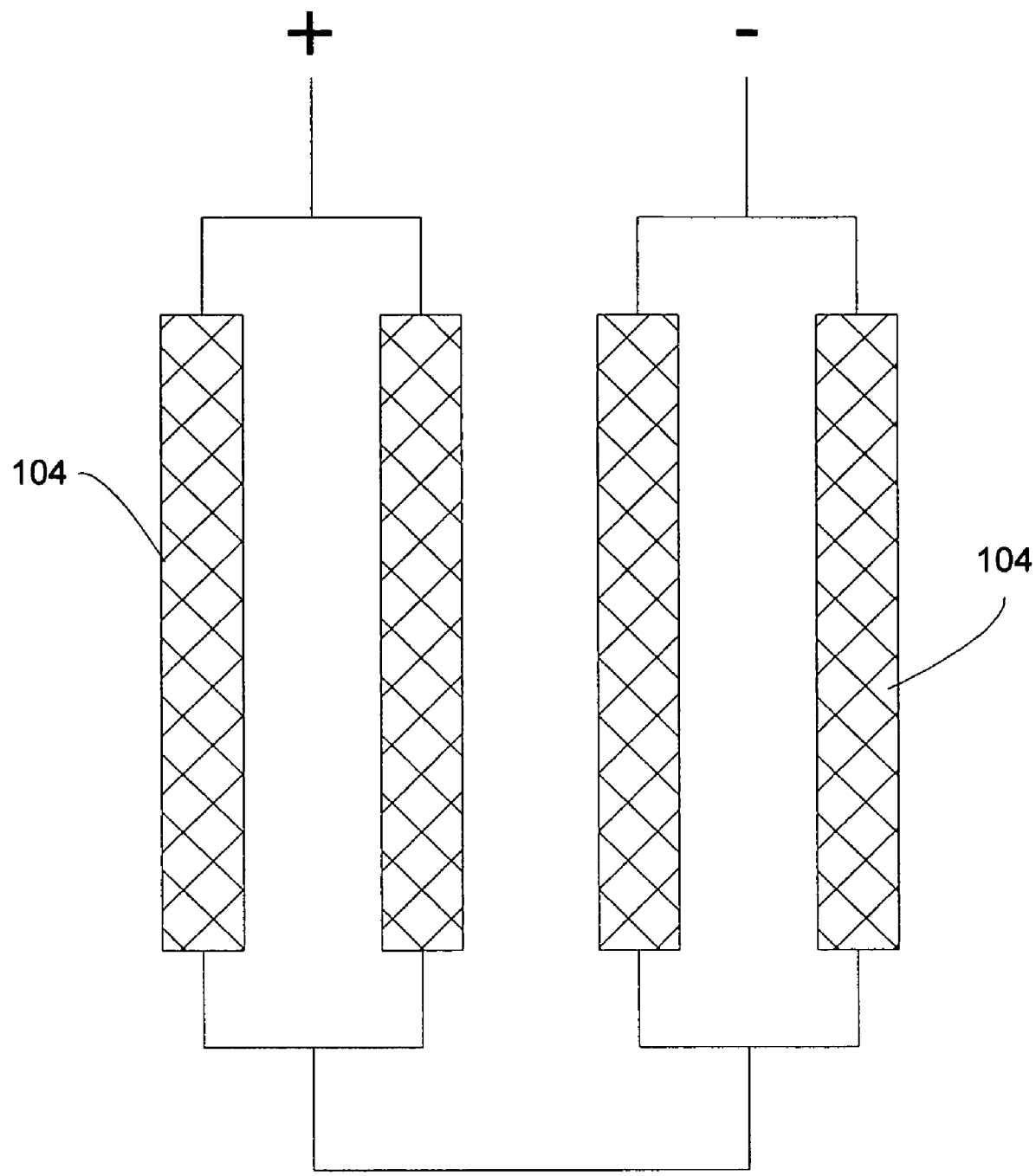
FIG. 11 is a schematic diagram of heater elements for use in the superconducting coils of FIGS. 9 and 10.

Aspects of the invention relating to the construction of a pancake wound coil containing a multiplicity of distributed heaters are shown in FIGS. 9 and 10. In this instance, magnet 102 comprises one or more pancake wound coils, i.e., windings 106 of FIGS. 9 and 10. A pancake wound coil is usually wound from a tape conductor. Each pancake is wound separately or in pairs and the pancakes are stacked and connected electrically in series to form windings 106 (see FIG. 10). The heaters 104 are preferably placed between the pancakes. A particular heater configuration, consisting of four strips connected in a series and parallel combination, is shown in FIG. 9. Embodiments of the invention include the possibility of different heater configurations that cover a desired fraction of the surface of the pancake (e.g., a curved strip instead of straight strips). The heaters 104 are shown in a partially exploded assembly in FIG. 10, placed between every pancake of magnet 102. Depending on the desired fraction of the coil to be driven normal by heaters 104, a lower density of heaters 104 is possible. The strips that constitute a given heater 104 may be connected in a variety of ways. An electrical schematic for the heater configuration of FIG. 9 is shown in FIG. 11 and provides a particular combination of series and parallel strips to form the heater 104. Heaters 104 between successive pancakes may be connected in series as shown in FIG. 11 but other configurations are contemplated. The heaters 104 may be placed between the pancakes as magnet 102 is assembled from the individual pancakes and, in the present example, connected electrically in series.

Aspects of the present invention may be further described by the relationships among the parameters that define the configuration and performance of magnet windings 106 and heaters 104.

One example of a superconducting coil to be protected from quench conditions is a solenoid having an inside winding radius $a_1$, an outside winding radius $a_2$, and a length of the winding pack 2b. The coil may be layer wound or pancake wound, and it may be one coil among a set of coils that typically form a high field magnet, or it may be a single stand alone coil.

The distributed heater is designed to heat a fraction $f_c$ of the coil volume at a rate to give a temperature rise $\Delta T$ in a time interval $\Delta t$. The power required is:

$$P_c = f_c \delta C_p 2b\pi(a_2^2 - a_1^2)\Delta T/\Delta t \tag{1}$$

where $\delta$ is the average density of the composite coil windings, containing the composite superconductor and insulation; $C_p$ is the average specific heat; and the coil volume is expressed in terms of the coil dimensions. From the usual expressions for a resistive element, the developed heater power for a heater with current $I_h$ and resistance $R_{total}$ is:

$$P_h = I_h V_{total} = I_h^2 R_{total}. \tag{2}$$

Equating the required and developed heater power in (1) and (2) immediately gives the total heater voltage for a given heater current as:

$$V_{total} = (f_c \delta C_p 2b\pi(a_2^2 - a_1^2)\Delta T/\Delta t)/I_h \tag{3}$$

and the corresponding total heater resistance follows from (2) and (3).

The performance of a heater element is described in terms of the heat into the windings being confined to the portion of the windings directly adjacent to the heater element. In actuality, there will be some thermal conductance of the heat to portions of the windings that extend beyond the region directly adjacent to or under the heater. The validity of the analysis that uses the volume of the windings directly adjacent to the heater is based on the somewhat limited thermal conductivity of the windings, the fact that the heat input is transient, and importantly on the fact that the heater element is relatively broad. Therefore, the heating under the majority of the heater width and length will be uniform.

As described above, the heater element (i.e., heater 104) may be a thin resistive strip with a low, and in the present context insignificant, heat capacity. As an example, the resistive strip has a thickness of about 0.1 mm or less and preferably 0.05 mm or less An electrical current, caused to flow in the resistive heater element will dissipate heat and quickly cause the temperature of the heater to increase. After an initial transient increase, the temperature of the heater element is limited by the heat flux from the heater to the adjacent portion of the coil, and the performance of the heater may be described by the heat flux.

A heater element serves to heat the two adjacent layers or pancakes. Heater elements between successive layers or pancakes may be placed in corresponding position, so that in effect the portion of windings under the heater element is being heated by the two heater elements on each side. This situation is simplified in the discussion by equivalently describing one heater element as heating one portion of the windings.

The balance between the heat capacity of the portion of the windings adjacent to the heater for a temperature rise $\Delta T$, and the heat generated by the heater element in a time $\Delta t$ is given by:

$$\delta C_p \Delta T A_h t_n = W_h A_h \Delta t \tag{4}$$

where $A_h$ is the area of the broad face of the heater; $t_n$ is the thickness of the created normal zone adjacent to the heater; and $W_h$ is the heat flux per unit area of the heater. The heat flux required for a given rate of temperature increase is therefore:

$$W_h = C_p t_n \Delta T/\Delta t. \tag{5}$$

The heat flux that results from a heater resistance $R_h$ with a current $I_h$ is:

$$W_h = I_h^2 R_h / A_h \qquad (6)$$

which may be expressed in terms of the heater dimensions as:

$$W_h = I_h^2 \rho_h / (w_h^2 t_h) \qquad (7)$$

where $I_h$ is the current in the heater strip of resistivity $\rho_h$, width $w_h$, and thickness $t_h$.

Equating the expressions for the heat flux gives:

$$t_h w_h^2 = \frac{I_h^2 \rho_h}{\delta C_p t_n \Delta T / \Delta t} \qquad (8)$$

as a general relation among heater parameters.

In the construction of a layer wound coil, the area of the heater broad face is selected to be a fraction $f_l$ of the layer area. Using an average layer area, the required area of the heater is:

$$A_h = l_h w_h = f_l 2 b \pi (a_1 + a_2) \qquad (9)$$

In the example of a layer wound coil, the heater length $l_h$ is chosen to be a multiple n of the coil length:

$$l_h = n 2b \qquad (10)$$

so that from (9) the heater width is given by:

$$w_h = f_l \pi (a_1 + a_2) / n \qquad (11)$$

and the heater thickness is then given by (8) as:

$$t_h = \frac{I_h^2 \rho_h}{\delta C_p t_n \Delta T / \Delta t} \frac{1}{w_h^2}. \qquad (12)$$

In this way, all of the heater dimensions are determined for a layer wound coil.

The number of heaters $N_h$ may equal the number of layers $N_l$, but may be less depending on the distribution selected for the heaters. The thickness of the normal zone $t_n$ created by the heater may equal the thickness of the adjacent layer $t_l$, but may be greater depending on the radial thermal diffusion rate in the coil. The fraction of the radial depth $f_a$ of the coil that is made normal by the action of the heaters is given by:

$$f_a = N_h t_n / N_l t_l. \qquad (13)$$

The volume fraction $f_c$ of the windings that is driven normal by the heaters is the product of the fraction of the area of the layers covered by the heaters $f_l$, and the fraction of the total radial depth under the heaters that is driven normal $f_a$, as given by:

$$f_c = f_a f_l. \qquad (14)$$

The relationships among the heater parameters for a pancake wound coil are somewhat different than for a layer wound coil. From the general relation among the heater parameters (8) there follows:

$$w_h = \left[ \frac{I_h^2 \rho_h}{\delta C_p t_n \Delta T / \Delta t} \frac{1}{t_h} \right]^{1/2} \qquad (15)$$

as an expression for the heater width when the heater thickness is selected as an independent variable.

The area of the heater broad face is selected to cover a fraction $f_p$ of the surface of the adjacent pancake coil. This condition is expressed by:

$$A_h = l_h w_h = f_p \pi (a_2^2 - a_1^2) \qquad (16)$$

which results in the required heater length as a function of the heater width for the required area fraction as:

$$l_h = f_p \pi (a_2^2 - a_1^2) / w_h. \qquad (17)$$

For a selected heater thickness, expressions (14) and (15) give the width and length to define an individual heater element. In this way, all of the heater dimensions are determined for a pancake wound coil.

The number of heaters $N_h$ may equal the number of pancakes $N_p$, but may be less depending on the distribution selected for the heaters. The thickness of the normal zone $t_n$ created by the heater may equal the thickness of the adjacent pancake $t_p$, but may be greater depending on the axial thermal diffusion rate in the coil. The fraction of the winding length $f_b$ of the coil that is made normal by the action of the heaters is given by:

$$f_b = N_h t_n / N_p t_p. \qquad (18)$$

The volume fraction $f_c$ of the windings that is driven normal by the heaters is the product of the fraction of the area of the pancakes covered by the heaters $f_p$ and the fraction of the total axial length under the heaters that is driven normal $f_b$, as given by:

$$f_c = f_b f_p. \qquad (19)$$

For both the layer wound and pancake wound coils, the resistance of a heater element is:

$$R_h = \rho_h l_h / (w_h t_h) \qquad (20)$$

and the total heater resistance is that of $N_h$ heater elements in series as given by:

$$R_{total} = N_h R_h \qquad (21)$$

and the total heater voltage is:

$$V_{total} = I_h R_{total}. \qquad (22)$$

The overall circuit of the magnet, including heaters distributed within the volume of the windings and the circuit configuration external to the magnet, are the subjects of this invention.

Referring now to FIGS. 12A and 12B, a magnet circuit 110 (indicated by reference character 110A in FIG. 12A and reference character 110B in FIG. 12B) includes superconducting magnet 102 operated by a power supply 112. In the case that the magnet 102 is fully superconducting, it may be well represented as a pure inductor. In the event of a quench condition, the quench results in a resistive normal zone in magnet 102, and may be simply represented by a resistance in addition to the inductance of magnet 102. The protection circuit 110 may also include various external switches, persistent switches, additional resistors, subdivision of the windings 106 of magnet 102 into separate inductors (see FIG. 12B), additional current loops provided by shunts on the subdivided coils, and additional heater elements that may or may not be part of the magnet circuit. Furthermore, active quench protection systems often include a quench detector 114 for recognizing a quench condition. As an example, the quench detector identifies a quench through the value of voltages measured on the windings 106 of magnet 102 and initiates actions (e.g, supplying voltages that in turn cause actions, such as the opening of a switch 116).

As described above, protection systems may be classified simply as "external" or "internal," depending on whether the magnetic stored energy is dissipated external to the windings 106 of magnet 102 and to the cold space of magnet 102 or internal within the material volume of the magnet windings 106. Protection systems may also be classified as "active" or "passive." An active protection system takes action to modify the magnet circuit upon the occurrence of a quench (e.g., by closing switches or energizing heaters that are not part of the magnet's operational circuit). In contrast, the magnet circuit remains unchanged in by a passive protection system but its response is such that it limits the negative effects of a quench.

The quench protection circuit 110 according to aspects of the present invention is shown in FIGS. 12A and 12B, where the superconducting magnet 102 or coil is powered by a current from the power supply 112 when the switch 116 is in the normally closed position. When the active quench detector 114 recognizes a quench, for example from a measured voltage on the superconducting coil or a section of the superconducting coil that exceeds a preset threshold voltage, quench detector 114 opens switch 116 by providing, for example, a voltage signal. The interruption of the current through the inductance that characterizes the coil will result in the appearance of a voltage across points a and b shown in circuit 110. As the current through switch 116 is interrupted, the voltage ab will increase until the conduction threshold of a diode set 118 is reached and the diode 118 conducts the magnet current. The current then also flows through heater(s) 104 which is in physical, thermal contact with the windings 106 of the coil, as indicated by cross hatching. The current flow in the resistive element of heater 104 causes dissipation of energy resulting in heating of heater 104 and, through thermal conduction, heating of the adjacent coil windings 106. The dissipation rate of energy in heater 104 is arranged through its design, including the circuit of the resistive heater and the resistance of the heater, to cause sufficiently rapid heating of windings 106. In turn, a rapid quench of a volume of the coil windings 106 results. The rapid spread of the initial quench zone induced by heating a significant fraction of the winding volume assures the protection of the coil. The circuit can be applied to a single section coil, as shown in FIG. 12A, or to a subdivided coil with shunts on the coil sections, as shown in FIG. 12B.

There are several variations of circuit 110 according to the invention. For example, switch 116 may be mechanical or electronic and may be located in the system at either room temperature or within the cold space of magnet 102. Also, the diode 118 may be located at either room temperature or within the cold space and may be a different type of electronic switch.

The novelty and nonobviousness of the inventive circuit 110 arises at least in part from the arrangement and nature of the components in the circuits shown in FIGS. 12A and 12B. The utility of the invention may be demonstrated by the advantages of the invention over the prior art, as described in greater detail below.

Figure 1:
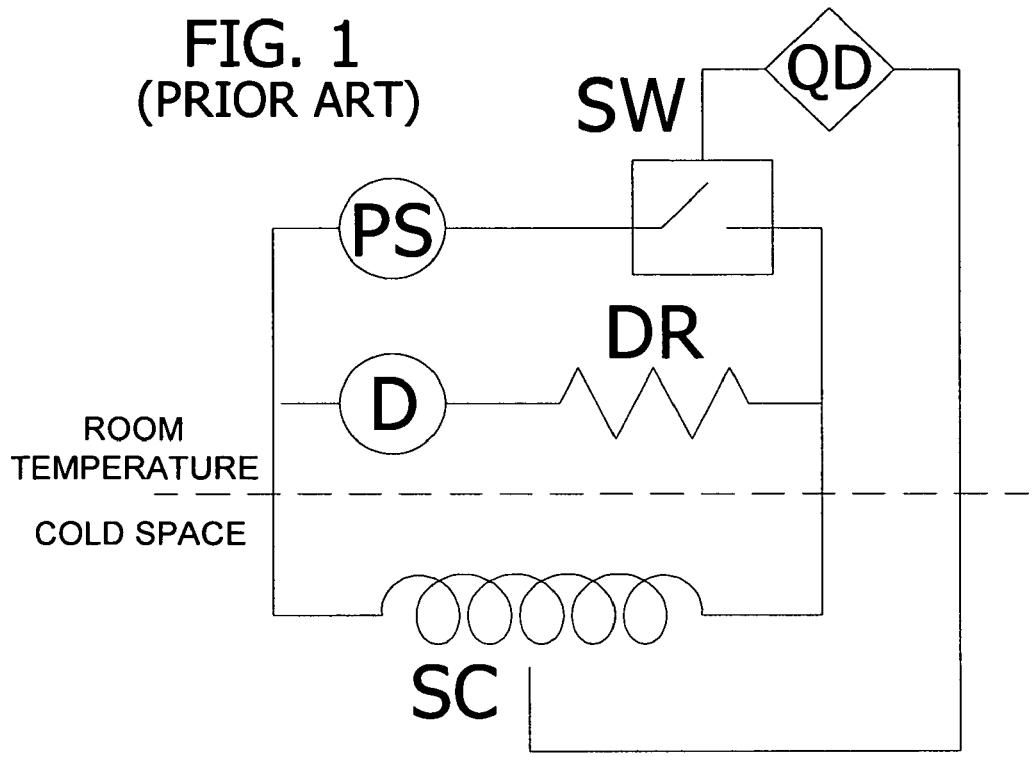
FIG. 1 is a schematic diagram of an exemplary active protection circuit having a switch in series with a magnet power supply and an external dump resistor according to the prior art.

Comparing the invention as embodied by circuit 110 of FIGS. 12A and 12B to a conventional active protection circuit that employs a dump resistor in parallel with the magnet (e.g., FIG. 1), exemplifies advantages of the present invention over the prior art. In FIG. 1, for example, the dump resistor is placed outside the cryogenic environment at room temperature. There may or may not be a diode in series with the dump resistor. When the quench detector identifies the presence of a quench condition, the convention circuit opens the switch and discharges the energy in the inductive coil through the dump resistor. The dump resistor is designed to be relatively large in comparison to the resistance of the expected normal zone in the magnet so that the majority of stored energy is dissipated in the external dump resistor. The dump resistor is also designed to provide a discharge time constant sufficiently fast so as to prevent overheating of the quench initiation normal zone, which tends to be the region of highest temperature in the coil or the hot spot.

The decay time constant of the conventional circuit of FIG. 1 is roughly L/R, where L is the coil inductance and R is the external resistance, under the assumption that the internal resistance of the quenching coil is small. In this approximation, the time constant is alternatively expressed as 2E/IV, where E is the magnet stored energy, I is the operating current, and V is the discharge voltage. This expression makes clear that the IV product for the conventional circuit must be sufficiently large to give a short time constant. Because of the limits on the voltage V imposed by switch design and dielectric design of the magnet, this method of protection is normally used in cases where the operating current I can be large, as with very large magnets.

In contrast, HTS conductors for coil applications are exemplified by low currents. Therefore, the application of the active external dump protection system of FIG. 1 is not suitable for quench protection in an HTS system unless the stored magnetic energy E is particularly small so as to limit the required value of V even for low values of I.

The distributed resistance of the magnet to achieve the energy discharge according to the present invention provides significant advantages over the prior art circuit described above. For example, the voltage at the switch required for the effective operation of the circuit in FIG. 12A or FIG. 12B is significantly less than the voltage required by the circuit in FIG. 1 to achieve the same time constant. Furthermore, for relatively small coils having a low value of stored energy, the reduction of the switch voltage permits the use of a smaller and lighter mechanical switch, or alternatively, a solid state electronic switch instead of a mechanical circuit breaker. For coils that have larger stored energy but low operating current, the voltage required in the circuit of the prior art exceeds the practical value for the dielectric design of most superconducting coils and therefore is not used for such coils. In contrast, circuit 110 remains applicable to low current coils of increasing energy by limiting the switch voltage a value compatible with known magnet design.

Figure 2:
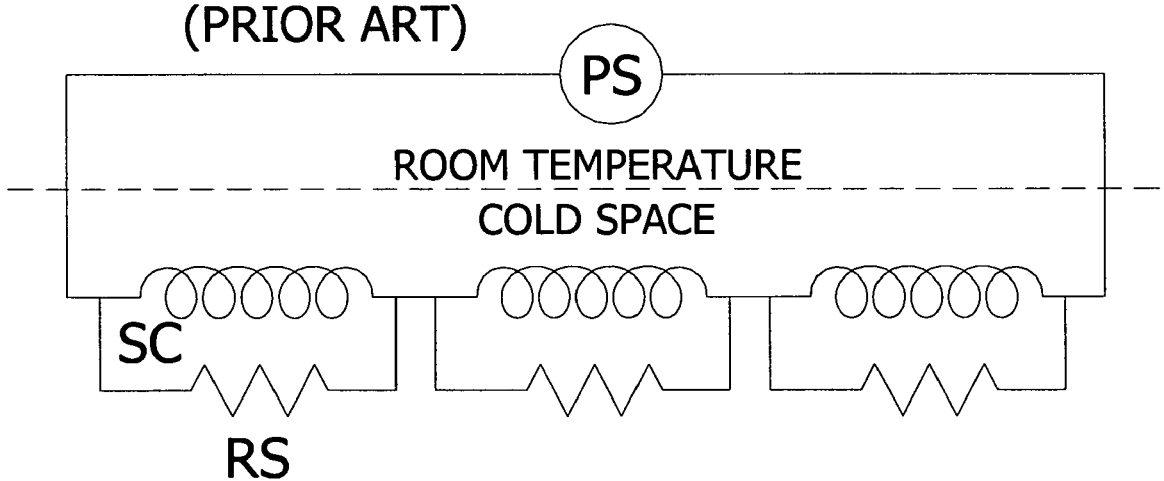
FIG. 2 is a schematic diagram of an exemplary passive protection circuit having a shunt loop according to the prior art.

A common passive protection circuit such as shown in FIG. 2 also fails to achieve adequate quench protection in an HTS coil. The circuit of FIG. 2 essentially depends on dissipation of energy within the coils themselves. Shunts facilitate the spread of the normal zone while limiting the energy dissipation in the initial coil(s) to go to a normal state. The shunts allow the rapid decay of the current in a coil with normal zone by the inductive coupling to nearby coils, thereby limiting the energy deposition in the normal zone. This conventional circuit also facilitates the spread of the normal zone by the inductive coupling resulting in ac loss heating or currents increased to the critical current in neighboring coils. In addition, the circuit of FIG. 2 allows more time for the spread of the initial normal zone. Although this conventional circuit provides advantages for some types of magnets over the protection circuit of FIG. 1, it depends essentially on a relatively rapid growth of resistance at the quench initiation normal zone to affect the inductive transfer of current. The experience with HTS coils, however, indicates a relatively slow rate of normal zone propagation and associated resistance growth at the quench zone, and as a result, this conventional protection circuit is ineffective for the quench protection of HTS coils.

In contrast to the prior art, circuit 110 primarily employs a distribution of quench heaters over and within the coil windings to heat the adjacent conductor volume rather than relying on the quench propagation rate within the windings. As such, circuit 110 of FIGS. 12A and 12B is effective in generating a sufficiently large normal zone to protect an HTS coil, while the prior art circuit of FIG. 2 is not.

Figure 3A:
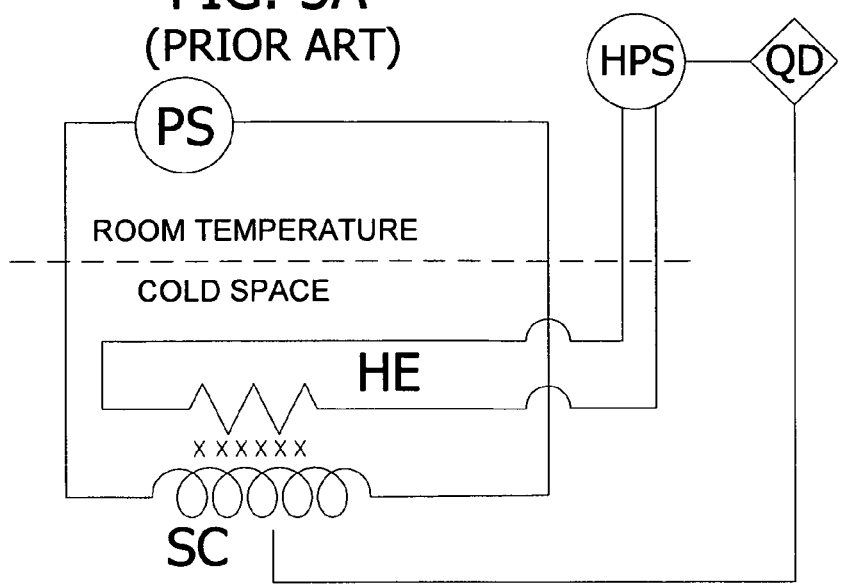
FIG. 3A and FIG. 3B are schematic diagrams of exemplary active protection circuits having external heater power supplies according to the prior art.
Figure 3B:
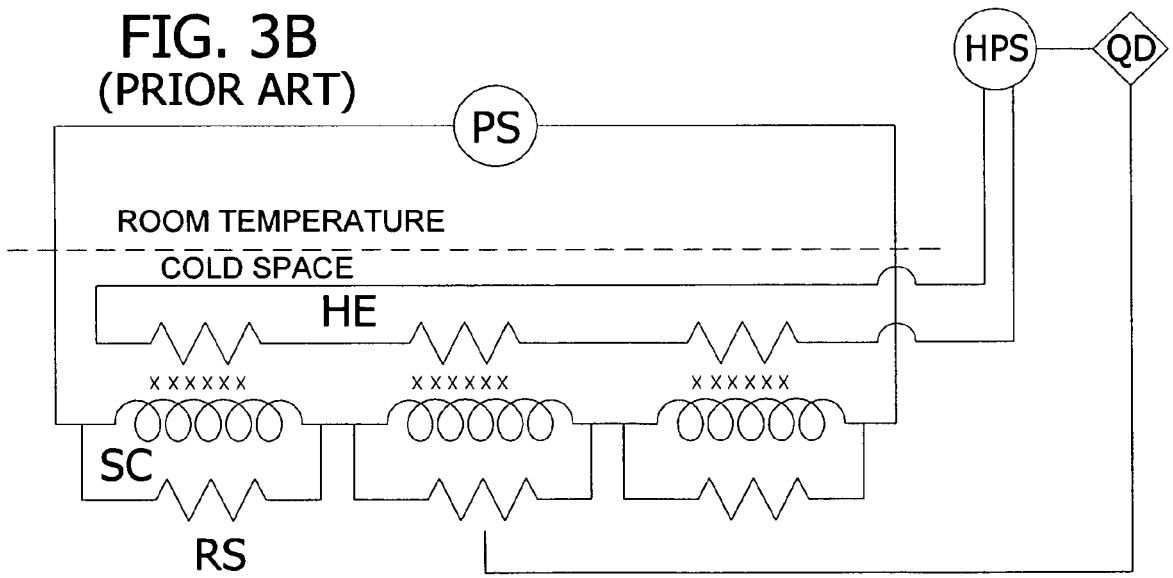

Referring now to the active protection system of FIGS. 3A and 3B, these conventional circuits rely on the internal dissipation of the stored energy and employ quench heaters in thermal contact with the windings to spread the normal zone. In each of these circuits, a quench detector is used to recognize a quench condition and to activate an external quench heater power supply. The heaters warm and cause a quench condition in the extended volume of the windings adjacent to the heaters. The volume of the quench zone is further increased by the normal zone propagation. In this instance, the external heater power supply of FIGS. 3A and 3B must be constantly ready to deliver the required current to the quench heaters with a delay of no more than 1 second and typically no more than 100 milliseconds.

In contrast to the prior art, the power supply 112 for heaters 104 in circuit 110 is the magnet itself, which eliminates the need for a separate heater power supply. Furthermore, the turn-on time for heaters 104, as governed by the opening time of switch 116, may be readily achieved with standard available components. For example, a typical mechanical contactor switch has an opening time of 10 milliseconds and a typical electronic switch has an opening time of a few milliseconds.

Figure 4A:
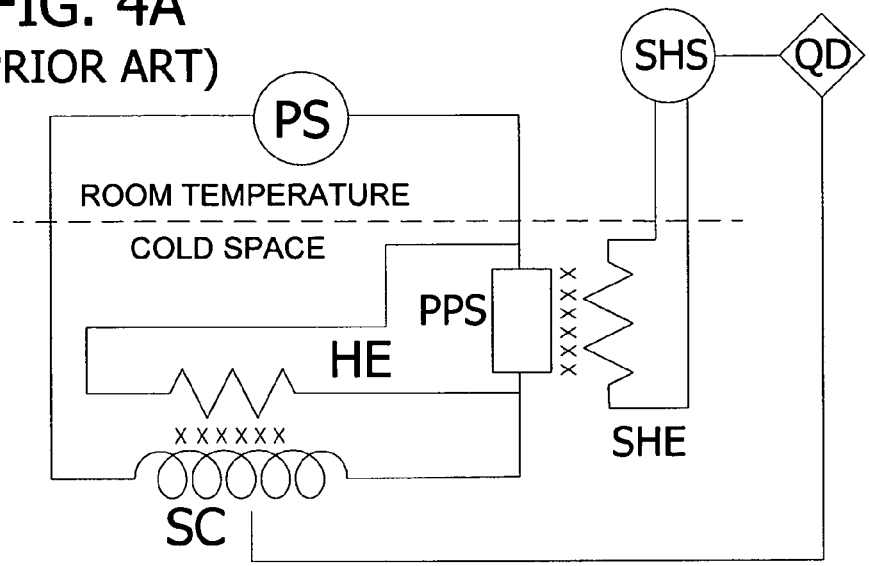
FIGS. 4A and 4B are schematic diagrams of exemplary active protection circuits having protection persistent switches and external switch heater power supplies according to the prior art.
Figure 4B:
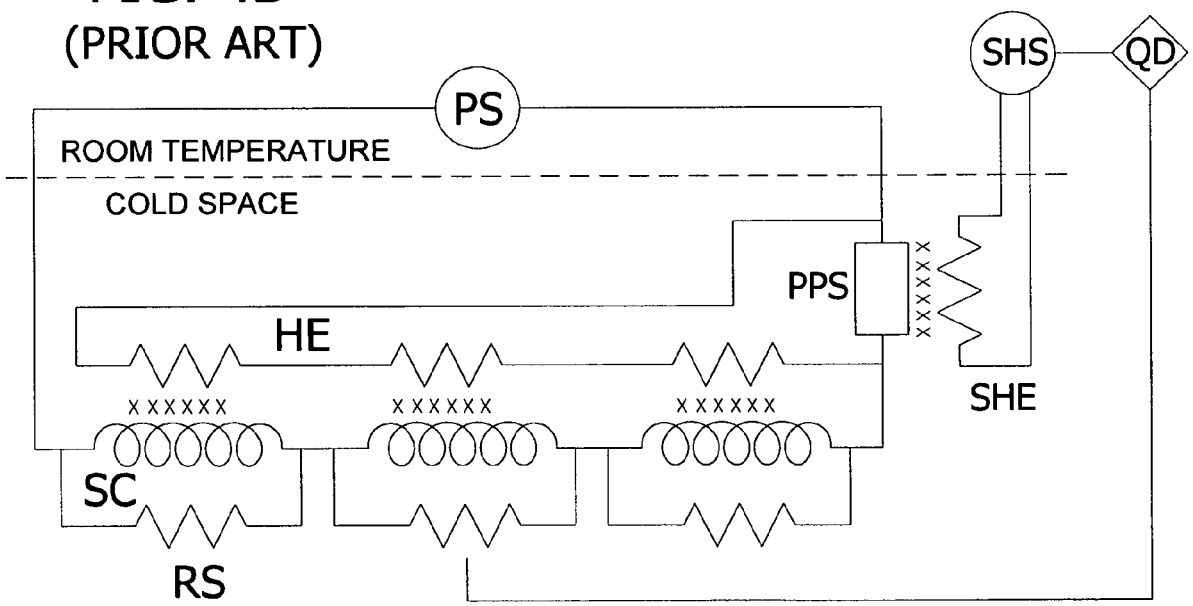

Protection circuits known in the prior art for use with LTS coils have combined internal energy dissipation of the stored energy, heaters in contact with the windings, and the use of the magnet itself as the heater power supply (see FIGS. 4A and 4B). But the conventional active circuit of FIGS. 4A and 4B also places its quench heater circuit in parallel with a secondary, or protection, persistent switch located in the cold space of the magnet. In each of these conventional circuits, when the quench detector recognizes a quench condition, the quench detector activates an external heater power supply. This heater supply powers the heater of the protection persistent switch to quench the switch and thereby cause it to open (i.e., become resistive). The magnet current of the circuit, which is coupled to the magnetic stored energy, becomes split between the resistive persistent switch and the quench heater circuit.

In contrast to the circuits of FIGS. 4A and 4B, circuit 110 does not require a protection persistent switch, but instead uses a switch at room temperature. For HTS coils operating at relatively high temperature, the circuit of either FIG. 4A or FIG. 4B would require that the persistent switch must be formed of high temperature superconductor as well. Circuit 110 eliminates the need for the persistent switch, which is a significantly complex component.

Figure 5A:
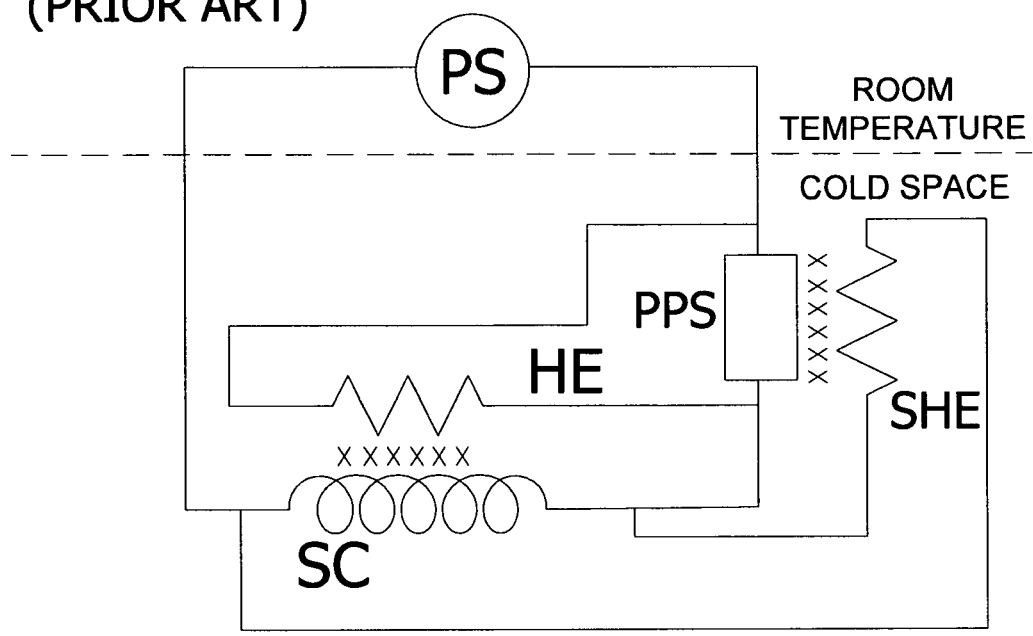
FIGS. 5A and 5B are schematic diagrams of exemplary passive protection circuits having protection persistent switches and internal switch heaters according to the prior art.
Figure 5B:
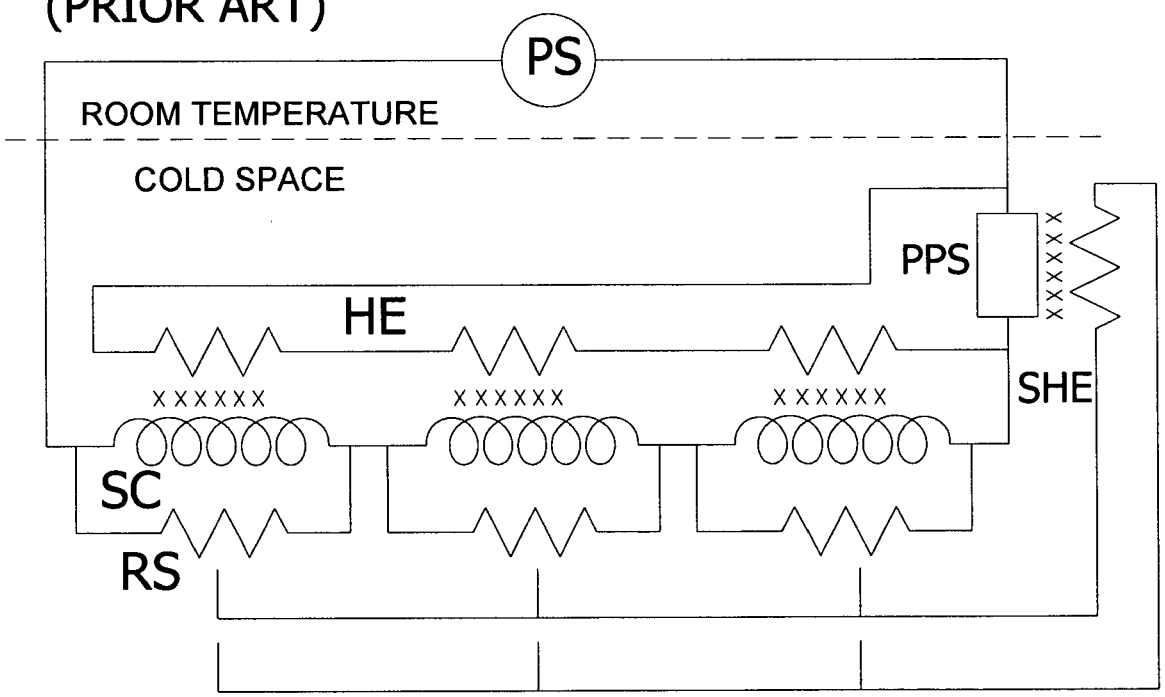

The passive versions of the conventional protection circuits of FIGS. 4A and 4B, shown in FIGS. 5A and 5B, respectively, also require protection persistent switches with parallel quench heater circuits. In the passive versions, the voltage that develops during quench powers the heater of the persistent switches and open them so that a portion of magnet current flows in the heater circuits. As described above, the circuit 110 embodying aspects of the invention does not require a persistent switch in the magnet circuit.

In addition, the passive versions shown in FIGS. 5A and 5B rely essentially on the rapid quench propagation and growth of voltage at the beginning of a quench for the performance of the circuit. Given the relatively slow quench propagation and voltage increase observed in HTS coils, such conventional circuits are not considered to by effective for HTS applications. Moreover, the active system of circuit 110 is fundamentally different than the passive systems of FIGS. 5A and 5B.

APPENDIX A sets forth two exemplary HTS coil applications of the present invention.

APPENDIX B sets forth exemplary data in Tables I-IX.

A high density of distributed heaters is a fundamental feature of the present invention. It is instructive to compare the density of heaters envisioned in this improvement with the density of heaters found in prior art. The heaters in embodiments of the invention and those found in prior art may be thin strips that have a well defined surface area. The effective surface area of a heater may be defined as the area of one side for heaters applied to the surface of coils, and the area of both sides for heaters embedded in the windings of coils. A coil, independent of solenoid or racetrack configuration, has a volume of windings. The ratio of the coil volume to the effective surface area of the heaters is an effective heater characteristic, with units of length and a value that is characteristic of the heater distribution. The effective heater characteristic is an inverse measure of the density of heaters associated with a coil. The effective heater characteristic in prior art applications is typically about 100 mm or greater. The higher density of heaters required for the protection of HTS coils is represented by an effective heater characteristic of 10 mm or less in the case of very low normal zone propagation velocity, upward to about 25 mm for cases of greater normal zone propagation. The multiplicity of heaters employed in embodiments of the present invention may be defined as those distributions for which the effective heater characteristic is about 25 mm or less.

On the basis of a general understanding of quench protection and the function of quench protection heaters, a beneficial effect of an increased density of heaters in limiting the temperature rise of the windings during quench may be anticipated by those skilled in the art. In order to gain the benefit from a greatly increased number of heaters as is required for the protection of HTS coils, the system of heaters must satisfy the constraints of being compatible with coil construction and operation of the heaters, in particular the current and voltage characteristics of the heaters. A primary result of the present invention is the demonstration by analysis of heater configurations compatible with the distribution of a multiplicity of heaters within the windings of coils, and that the performance of the entire set of heaters at currents characteristic of the operation of such magnets leads to voltages that are consistent with typical and expected dielectric design of the coils, and that this remains the case even in the limit of very low normal zone propagation rate and correspondingly high density of heaters. As a further consequence, it is thereby shown that the concept of a multiplicity of heaters is compatible with the use of the heaters in a variety of circuits, such as those shown in FIGS. 3A, 3B, 4A, 4B, 5A, and 5B, as well as the improved circuit shown in FIG. 12.

As described above, active protection methods embodying aspects of the invention provide a coil construction having a multiplicity of distributed heaters. Upon learning of the present invention, those skilled in the art will recognize that such a construction will be extremely effective in active protection circuits that include a source of power for the heaters. For this reason, a number of known circuits, including those shown in FIGS. 3A, 3B, 4A, 4B, 5A, and 5B, may be used with the distributed heaters discussed herein to accomplish improved quench protection according to one or more embodiments of the invention.

Although embodiments of the present invention are particularly well suited for protecting magnet coils wound with high temperature superconductors, it is to be understood that aspects of the invention may also be applied over the whole range of temperatures associated with the operation of superconducting magnet coils, including those wound with low temperature superconductors.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

APPENDIX A

EXAMPLE

HTS conductors operating at liquid helium temperature of 4 K are capable of operating at very high field. It is therefore possible to achieve very high fields in superconducting solenoid magnets by using HTS conductors in the inner most high field coils. An example is provided of a coil that might employ BSCCO HTS conductor and with parameters that are representative of a high field insert coil for the purpose of demonstrating the dimensions and performance of a distributed quench protection heater that follows from the above analysis. It is to be understood that the superconducting magnet coils of FIGS. 6, 7, 9, and 10 are positioned in a cold space, embodied by a cryostat or the like, for maintaining a desired temperature during operation.

The insert coil has an inner winding radius $a_1$, outer radius $a_2$, and length 2b as given in Table I of APPENDIX B. With an average current density of 125 A/mm$^2$, representative of the technology, the central field increment produced by the coil is 3.0 T. An insert coil has a stored magnetic energy both from the self-field and from the field produced from the other surrounding coils. For quench protection, it is useful to recognize the total magnetic stored energy density. A representative value for the inner coils of a high field magnet is given in Table I as an average energy per unit volume $e_v$ and per unit mass $e_m$.

In the case of internal protection, or internal energy dissipation, the stored energy is dissipated in the normal zone or normal volume of the windings. The temperature increase of a normal zone in a magnet during quench depends on the fraction of the coil volume $f_c$ in which the stored energy is dissipated. As the normal zone decreases in volume, the dissipated energy density increases, and the associated temperature rise of the windings in the normal zone increases. In Table II of APPENDIX B, a maximum temperature rise ΔT for the example coil is selected as a balance between higher temperatures, at which there are increasing concerns for thermal stress in the windings, and lower temperatures, at which the design and implementation of the system of protection heaters becomes more difficult. For this temperature rise from liquid helium temperature, the enthalpy characteristic of the materials in the windings gives the corresponding thermal energy density, which in turn gives the fraction of the windings that must be involved in the normal zone to limit the dissipated energy density to this value. In this example, the required normal fraction of the coil $f_c$ is 0.4, a relatively high value due to the fact that the magnetic energy density of an insert coil operating in series in a high background field magnet is correspondingly high.

The parameters of the distributed heaters that can quickly raise the temperature in the fraction $f_c$ of the example coil and cause it to quench, thereby limiting the dissipation energy density and the associated temperature rise, are given in Table III of APPENDIX B following the analysis given above. The heaters have the general configuration given in FIGS. 6 and 7. The heater strips are designed to traverse the length of the coil twice, giving n a value of 2 and determining the length $l_h$ of the heater, and thereby returning to the start end of the coil to facilitate electrical connection. The heater strips are designed to cover a fraction $f_l$, of a layer area, which then determines the total width $w_h$ of the heater on that layer. The total width may be divided into any number of parallel strips, as convenient to spread the heater over the surface of the layer and for purposes of construction. The heater resistivity is chosen as representative of stainless steel in the appropriate temperature range. The effective specific heat $C_p$ assumes that the windings will be heated quickly to the temperature range of 30 K to 50 K. The example coil, with 22 layers of layer thickness 1 mm, is assumed to have heaters between every other layer and to heat the adjacent two layers, giving the normal zone thickness $t_n$ of 2 mm. The rate of temperature rise ΔT/Δt is chosen to be 25 K/s, giving a time to quench the insert coil on the order of 2 seconds, consistent with large high field magnet design and quench experience. This rate of temperature rise is estimated to result in the forced quench of the insert coil in a time short in comparison with the quench decay time of the surrounding coils, guaranteeing that the analysis based on the operating magnetic energy density in the coil is suitable. The assumed heater current $I_h$ of 150 A is characteristic of currents available from the operation of high field superconducting magnets. The resulting heater thickness $t_h$, an important result of the analysis, is practical for a metallic resistive heater strip and sufficiently thin to incorporate into the windings between layers. The heater resistance and voltage given in Table III follow from the heater dimensions and heater current as shown in the analysis. The example demonstrates that the concept of a multiplicity of distributed heaters, to cause a quench of a large portion of an HTS coil and thereby protect the coil, leads to a practical design configuration of the heaters and to acceptable operating voltages.

This application example represents a limiting case in which the natural normal zone propagation of the HTS conductor is very low and does not contribute to the normal zone volume fraction of the coil. To the extent that the finite normal zone propagation of the conductor does contribute, the number of heaters can be reduced. Based on current understanding of HTS conductor behavior, even with some contribution of the normal zone propagation from the conductor, the number of protection heaters required for HTS coil protection will be significantly greater than previously used for LTS coils, and will require the distribution over the volume of the coil envisioned here that has not previously been employed.

EXAMPLE

Coils containing HTS conductor are capable of operating at relatively high temperature, including a range of temperature for cryogenic nitrogen, 65 K to 77 K. The analysis is applied to a set of stand alone solenoid coils assumed to be wound from YBCO composite tape superconductor in a pancake configuration. The examples further demonstrate the heater design, and serve to provide a comparison between the inventive protection circuit 110 of FIGS. 12A and 12B, and the prior art external dump resistor circuit of FIG. 1.

The analysis is given for two solenoids defined by an inner winding radius $a_1$, outer radius $a_2$ and winding length $2b$, as given in Table IV of APPENDIX B. The dimensions are such as to give a central field of 3.6 T for an average current density $J_{ave}$ over the winding pack of 100 A/mm² and 150 A/mm² in Case I and Case II, respectively. The magnetic stored energy per unit volume of the windings $e_v$, is given in the table for the two coils, together with an average mass density $\delta$ assumed for the windings, and the resulting energy per unit mass $e_m$.

The protection circuits of FIGS. 12A and 12B are active, so that a quench condition must first be detected before the heaters are activated. In that time interval before the magnet is generally quenched by the heaters, the initial quench zone hot spot temperature will increase. The allowed temperature rise $\Delta T$ of 34 K in the normal regions caused by the heaters is selected to be low in recognition that the hot spot temperature rise at the origin of the quench will be greater. For the allowed temperature rise of the normal regions from nitrogen temperature, the corresponding thermal energy density necessary to produce the increase is given by the difference in enthalpy of the windings at these temperatures. A comparison with the stored magnetic energy density in the windings then gives the fraction of the windings over which the energy must be dissipated in order to limit the temperature rise to the selected value. In order to limit the temperature rise to 34 K, the heaters must create a normal zone volume fraction of the windings of 0.15 and 0.23 for the two example solenoids, as given in the Table V of APPENDIX B.

These examples study the influence of the average current density and the composition of the tape conductor on the protection circuit performance. For each of the two example coils there is examined three configurations of tape conductor, giving rise to Cases I a, b, and c, and Cases II a, b, and c, shown in Table VI of APPENDIX B. The conductors consist of a layer construction of copper stabilizer, or substrate, and the remaining non-copper layers that include the actual superconducting material. In each case, the tape width $w_t$ and the combined thickness of the non-copper layers $t_{nc}$ are assumed constant at values representative of current technology. The thickness of the copper layer $t_{cu}$ is varied systematically. The total tape thickness $t_{tape}$ is the sum of the copper and non-copper thicknesses. The resulting area fractions $f_{nc}$ and $f_{cu}$ of the copper layer and non-copper layers follow. As the composition of the conductor is varied, the current density in the non-copper layer of the conductor $J_{nc}$ is adjusted so that the selected value of the tape current density is achieved. In each case, the copper current density $J_{cu}$, defined as the current density that would result if all the current were to flow in the copper layer, follows as a result. Given the tape dimensions and current density, the value of the current $I_o$ in the tape is determined. The current in the tape is the operating current of the coil and, in the circuit of the invention, is used as the current in the heater.

The heater design for each case is given in Table VII of APPENDIX B. The pancake thickness $t_p$ is equal to the tape width $w_t$. In a pancake coil construction, a small separation exists between pancakes for insulation. It is assumed here that the strip heaters will also occupy the small separation between pancakes, but for simplicity the separation distance is ignored in the analysis. The tape width and pancake thickness used in the analysis are characteristic of the technology. The number of pancakes $N_p$ corresponds to the solenoid length. The thickness of the normal zone adjacent to the heaters is assumed to be one pancake thick. Heaters are placed on each pancake to give the number of heaters $N_h$. The heater current $I_h$ is taken to be the coil operating current. The heater resistivity $\rho_h$ is representative of steel strip at the temperature. The specific heat $C_p$ is an average value 0.25 J/g-K for the windings at the temperature range under consideration. The rate of increase of temperature $\Delta T/\Delta t$ of the windings caused by the heater is selected to rapidly quench the coil. A heater thickness $t_h$ may be used as the independent variable in the case of a pancake construction, and a value of 0.05 mm is selected. The resulting heater width $w_h$ may be split into parallel strips and electrical parallel paths. The fraction $f_p$ of the area of a pancake that is covered by the heaters is chosen as equal to the required coil volume fraction, consistent with the distribution of the heaters and the resulting value of 1 for $f_b$, which is the fraction of the axial length under the heaters that is quenched. The length $l_h$ of the heaters on a given pancake follows from the analysis. Once the heater dimensions are determined, the heater resistance is known, and given the current in the heaters, the heater voltage is determined. The total heater resistance and voltage correspond to having all the heaters in series.

The calculated total voltage on the heater $V_{h\ total}$, which is the sum of the voltages of the heaters on all pancakes, exhibits regular trends among the cases. In each of the Cases I and II separately, as the amount of copper is increased in the conductor, the tape increases in thickness. The assumed constant average current density in these cases implies that as the amount of copper increases, the current density in the superconductor and current in the tape increase as well. In each case, the voltage required by the heater is seen to decrease. This can be understood as follows. The two coils I and II have comparable stored energy. In order to keep the temperature rise the same, a comparable volume of the coils must be quenched by the heater. The heaters must have similar areas and provide the same overall power. As the current in the heater increases, for the same power the voltage decreases accordingly. The voltage is not correlated with the copper thickness, or copper current density, as can be seen in Cases Ic and IIa.

Further insight into the operation of the invention is obtained from the decay time constant of the circuit that results from the heater driving a portion of the coil normal. The decay time constant may be estimated by expressing the energy per unit volume in the normal region of the coil as the average of the power dissipated into that region over the time of the decay. The time constant $T_{int}$ is:

$$i.\ \tau_{int} = \frac{2c_v/f_c}{\frac{\rho_{cu}}{f_{cu}}J_{tape}^2} \quad (23)$$

where $\rho_{cu}$ is the substrate resistivity, here taken to be copper, at an average temperature for the quench. The decay time constant is determined by the resistivity of the composite conductor, which is primarily determined by the copper resistivity and fraction of copper. The estimated decay time constants for the different cases are indicated in Table VIII of APPENDIX B.

In order to compare the performance of the invention with the performance of the prior art, the parameters associated with the use of external energy dump with the circuit of FIG. 1 are determined. The discharge time constant $T_x$ for a given allowed hotspot temperature may be estimated approximately by:

$$\tau_x = \frac{2\delta C \Delta T}{\frac{\rho_{cu}}{f_{cu}} J_{tape}^2} \quad (24)$$

where the temperature dependent properties of specific heat and resistivity are chosen as appropriate average values. Assuming a hotspot temperature rise $\Delta T$ of 60 K, Table IX of APPENDIX B gives the L/R time constant, the external resistance, and the initial voltage for the decay for each case.

The example cases are constructed so that the internal discharge time $T_{int}$ is significantly less than the corresponding external discharge time $T_x$ to allow the heater time to drive the windings normal, and thereby provide a fair comparison. The performance of the invention and prior art is seen in a comparison of voltages $V_{h\,total}$ and $V_x$ in Tables VII and IX. In each case, the use of the invention circuit, incorporating internal energy dissipation as facilitated by the multiplicity of distributed heaters, results in lower voltages, and the advantage of the invention increases as the available superconductor current density increases.

APPENDIX B

TABLE I

Parameters for insert solenoid.

| a1 | mm | 80 |
|---|---|---|
| a2 | mm | 102 |
| 2b | mm | 320 |
| $J_{ave}$ | A/mm² | 125 |
| $B_o$ | T | 3.0 |
| $e_v$ | J/mm³ | 0.1 |
| $\delta$ | g/mm³ | 8.0 × 10 − 3 |
| $e_m$ | J/g | 12.5 |

TABLE II

Insert solenoid required normal coil fraction for protection.

| $\Delta T$ | K | 170 |
|---|---|---|
| $e_m/f_c$ | J/g | 31 |
| $f_c$ | | 0.4 |

TABLE III

Insert solenoid heater parameters and performance.

| n | | 2 |
|---|---|---|
| $l_h$ | mm | 640 |
| $f_l$ | | 0.4 |
| $w_h$ | mm | 114 |
| $I_h$ | A | 150 |
| $\rho_h$ | Ω-mm | 7.0 × 10 − 4 |
| $C_p$ | J/g-K | 0.06 |
| $t_l$ | mm | 1 |
| $N_l$ | | 22 |
| $t_n$ | mm | 2 |
| $N_h$ | | 11 |
| $\Delta T/\Delta t$ | K/s | 25 |
| $t_h$ | mm | 0.05 |
| $R_h$ | Ω | 0.08 |
| $V_h$ | V | 11.7 |
| $R_{h\,total}$ | Ω | 0.9 |
| $V_{h\,total}$ | V | 129 |

TABLE IV

Parameters for stand alone solenoids.

| | | Case I | Case II |
|---|---|---|---|
| a1 | mm | 120 | 120 |
| a2 | mm | 156 | 144 |
| 2b | mm | 360 | 360 |
| Jave | A/mm2 | 100 | 150 |
| Bo | T | 3.6 | 3.6 |
| E | J | 1.17 × 105 | 1.09 × 105 |
| ev | J/mm3 | 0.010 | 0.015 |
| δ | g/mm3 | 8.0 × 10 − 3 | 8.0 × 10 − 3 |
| em | J/g | 1.30 | 1.93 |

TABLE V

Stand alone solenoid required normal coil fraction for protection.

| | | Case I | Case II |
|---|---|---|---|
| $\Delta T$ | K | 34 | 34 |
| $e_m/f_c$ | J/g | 8.5 | 8.5 |
| $f_c$ | | 0.15 | 0.23 |

TABLE VI

Stand alone solenoid tape conductor parameters.

| | | Case I | | | Case II | | |
|---|---|---|---|---|---|---|---|
| | | a | b | c | a | b | c |
| $t_{nc}$ | mm | 0.0900 | 0.0900 | 0.0900 | 0.0900 | 0.0900 | 0.0900 |
| $t_{cu}$ | mm | 0.0485 | 0.0736 | 0.1100 | 0.0485 | 0.0736 | 0.1100 |
| $t_{tape}$ | mm | 0.1385 | 0.1636 | 0.2000 | 0.1385 | 0.1636 | 0.2000 |
| $f_{nc}$ | | 0.65 | 0.55 | 0.45 | 0.65 | 0.55 | 0.45 |
| $f_{cu}$ | | 0.35 | 0.45 | 0.55 | 0.35 | 0.45 | 0.55 |
| $J_{nc}$ | A/mm2 | 154 | 182 | 222 | 231 | 273 | 333 |
| $J_{cu}$ | A/mm2 | 286 | 222 | 182 | 428 | 333 | 273 |
| $J_{tape}$ | A/mm2 | 100 | 100 | 100 | 150 | 150 | 150 |
| $W_t$ | mm | 4 | 4 | 4 | 4 | 4 | 4 |

TABLE VI-continued

Stand alone solenoid tape conductor parameters.

| | | Case I | | | Case II | | |
|---|---|---|---|---|---|---|---|
| | | a | b | c | a | b | c |
| $A_{tape}$ | mm2 | 0.554 | 0.655 | 0.800 | 0.554 | 0.655 | 0.800 |
| $I_{tape}$ | A | 55.4 | 65.5 | 80.0 | 83.1 | 98.2 | 120.0 |

TABLE VII

Stand alone solenoid heater parameters and performance.

| | | Case I | | | Case II | | |
|---|---|---|---|---|---|---|---|
| | | a | b | c | a | b | c |
| $t_p$ | mm | 0.4 | 0.4 | 0.4 | 0.4 | 0.4 | 0.4 |
| $N_p$ | | 90 | 90 | 90 | 90 | 90 | 90 |
| $t_n$ | mm | 0.4 | 0.4 | 0.4 | 0.4 | 0.4 | 0.4 |
| $N_h$ | | 90 | 90 | 90 | 90 | 90 | 90 |
| $I_h$ | A | 55.4 | 65.5 | 80.0 | 83.1 | 98.2 | 120.0 |
| $\rho_h$ | Ω-mm | $7.0 \times 10^{-4}$ | $7.0 \times 10^{-4}$ | $7.0 \times 10^{-4}$ | $7.0 \times 10^{-4}$ | $7.0 \times 10^{-4}$ | $7.0 \times 10^{-4}$ |
| $C_p$ | J/g-K | 0.25 | 0.25 | 0.25 | 0.25 | 0.25 | 0.25 |
| $\Delta T/\Delta t$ | K/s | 10 | 10 | 10 | 10 | 10 | 10 |
| $t_h$ | mm | 0.05 | 0.05 | 0.05 | 0.05 | 0.05 | 0.05 |
| $w_h$ | mm | 23 | 27 | 34 | 35 | 41 | 50 |
| $f_p$ | | 0.15 | 0.15 | 0.15 | 0.23 | 0.23 | 0.23 |
| $l_h$ | mm | 203 | 171 | 140 | 130 | 110 | 90 |
| $R_h$ | Ω | 0.12 | 0.09 | 0.06 | 0.05 | 0.04 | 0.03 |
| $V_h$ | V | 6.8 | 5.7 | 4.7 | 4.4 | 3.7 | 3.0 |
| $R_{h\ total}$ | Ω | 11.0 | 7.9 | 5.3 | 4.7 | 3.4 | 2.3 |
| $V_{h\ total}$ | V | 610 | 516 | 423 | 391 | 331 | 270 |

TABLE VIII

Stand alone solenoid discharge time constant with internal protection.

| | | Case I | | | Case II | | |
|---|---|---|---|---|---|---|---|
| | | a | b | c | a | b | c |
| $\rho_{cu}$ | Ω-mm | $3.88 \times 10^{-6}$ | $3.88 \times 10^{-6}$ | $3.88 \times 10^{-6}$ | $3.88 \times 10^{-6}$ | $3.88 \times 10^{-6}$ | $3.88 \times 10^{-6}$ |
| $T_{int}$ | s | 1.3 | 1.6 | 2.0 | 0.54 | 0.69 | 0.85 |

TABLE IX

Stand alone solenoid discharge time constant and voltage with external protection.

| | | Case I | | | Case II | | |
|---|---|---|---|---|---|---|---|
| | | a | b | c | a | b | c |
| $\Delta T_{hotspot}$ | K | 60 | 60 | 60 | 60 | 60 | 60 |
| $T_x$ | s | 2.2 | 2.8 | 3.4 | 0.96 | 1.2 | 1.5 |
| $R_x$ | Ω | 35.3 | 19.7 | 10.8 | 32.7 | 18.2 | 10.0 |
| $V_x$ | V | 1955 | 1287 | 861 | 2719 | 1790 | 1198 |

What is claimed is:

1. A method of constructing a superconducting coil, said method comprising:

winding at least one coil of high temperature superconductor, said coil comprising a plurality of layers of wound high temperature superconductor;

embedding a plurality of heater elements substantially uniformly throughout the coil according to a predetermined distribution, wherein the predetermined distribution of heater elements is a function of a desired volume fraction of the coil being driven into a normal state when the heater elements are activated and wherein the desired volume fraction of the coil being driven into the normal state is between about 0.15 and about 0.55, wherein each of said heater elements is positioned between adjacent layers of the coil and substantially in thermal contact with the layers of the coil adjacent thereto for driving the high temperature superconductor of said winding layers adjacent to each of the plurality of heater elements from a superconducting state into the normal state in response to a quench condition such that a plurality of normal regions are distributed throughout the coil in response to the quench condition, each of said normal regions having a large electrical resistance relative to a superconducting region of the coil, said heater elements further being energized in response to the quench condition, wherein magnetic energy accumulated within the coil during operation is dissipated in the plurality of heater elements in response to the quench condition and the temperature rise in the winding layers adjacent to each of the plurality of heater elements is limited to less than approximately 34 K; and cooling the coil and heating elements to an operating temperature less than approximately 80 K and greater than approximately 10 K.

2. The method of claim 1, further comprising supplying power to the coil for charging the coil, said coil storing magnetic energy therein when charged, said stored magnetic energy being dissipated in the heater elements in response to the quench condition.

3. The method of claim 1, wherein the high temperature superconductor (HTS) is selected from at least one of the following: BSCCO, YBCO, and MgB2.

4. The method of claim 1, wherein embedding the heater elements comprises extending the heater elements substantially the length of the coil.

5. The method of claim 1, wherein said heater elements comprise a plurality of electrically connected resistive strips distributed throughout the coil.

6. The method of claim 5, wherein each of the resistive strips has a thickness of less than or equal to about 0.1 mm.

7. The method of claim 1, wherein said heater elements comprise an integral resistive strip distributed throughout the coil.

8. The method of claim 1, wherein winding the coil comprises constructing at least one of the layers of the coil and wherein embedding the heater elements comprises positioning the heater elements adjacent to the at least one of layers of the layer wound coil during winding before constructing at least another one of the layers of the coil.

9. The method of claim 8, wherein a number of said heating elements equals a number of layers of said layer wound coil.

10. The method of claim 1, wherein the desired volume fraction of the coil being driven into the normal state is a function of stored energy per unit volume in the coil and a maximum temperature rise within the coil.

11. The method of claim 10, wherein the maximum temperature rise within the coil is a function of one or more of the following physical constraints: limiting physical strain on the coil due to heating; and preventing heat damage on the coil.

12. The method of claim 1, wherein the predetermined distribution of heater elements is a function of a desired heater density throughout the coil.

13. The method of claim 12, wherein embedding the heater elements comprises providing an effective heater characteristic of less than or equal to about 25 mm to obtain the desired heater density throughout the coil.

14. The method of claim 12, wherein embedding the heater elements comprises providing an effective heater characteristic of less than or equal to about 15 mm to obtain the desired heater density throughout the coil.

15. An active quench protection system for a superconducting coil, said system comprising:
at least one coil of high temperature superconductor (HTS), said coil comprising a plurality of layers of wound HTS at an operating temperature less than approximately 80 K and greater than approximately 10 K;
a power supply for charging the coil such that the coil stores magnetic energy therein;
a quench detector associated with the coil for detecting a quench condition therein;
a circuit breaker switch responsive to the quench detector for causing the heater elements to be energized with the magnetic energy stored in the coil; and
a plurality of heater elements embedded substantially uniformly throughout the coil according to a predetermined distribution, wherein the predetermined distribution of heater elements is a function of a desired volume fraction of the coil being driven into a normal state when the heater elements are activated and wherein the desired volume fraction of the coil being driven into the normal state is between about 0.15 and about 0.55, wherein each of said heater elements is positioned between adjacent layers of the coil and substantially in thermal contact with the layers of the coil adjacent thereto for driving the HTS of said winding layers adjacent to each of the plurality of heater elements from a superconducting state into the normal state in response to the detected quench condition such that a plurality of normal regions are distributed throughout the coil in response to the quench, each of said normal regions having a large electrical resistance relative to a superconducting region of the coil, wherein the temperature rise in the winding layers adjacent to each of the plurality of heater elements is limited to less than approximately 34 K.

16. The system of claim 15, wherein the HTS is selected from at least one of the following: BSCCO, YBCO, and MgB2.

17. The system of claim 15, wherein said heater elements extend substantially the length of the coil.

18. The system of claim 15, wherein said heater elements comprise a plurality of electrically connected resistive strips distributed throughout the coil.

19. The system of claim 18, wherein each of the resistive strips has a thickness of less than or equal to about 0.1 mm.

20. The system of claim 15, wherein the predetermined distribution of heater elements is a function of a desired volume fraction of the coil being driven into a normal state when the heater elements are activated.

21. The system of claim 15, wherein the predetermined distribution of heater elements is a function of a desired heater density throughout the coil.

22. A superconducting magnet comprising:
at least one coil of high temperature superconductor (HTS), said coil comprising a plurality of layers of wound HTS;
an active protection circuit for protecting the coil in response to a quench condition in the magnet, said protection circuit including a quench detector for detecting the quench condition and a plurality of heater elements embedded substantially uniformly throughout the coil according to a predetermined distribution, wherein the predetermined distribution of heater elements is a function of a desired volume fraction of the coil being driven into a normal state when the heater elements are activated and wherein the desired volume fraction of the coil being driven into the normal state is between about 0.15 and about 0.55, wherein each of said heater elements is positioned between adjacent layers of the coil and substantially in thermal contact with the layers of the coil adjacent thereto for driving the HTS of said winding layers adjacent to each of the plurality of heater elements from a superconducting state into the normal state in response to the detected quench condition such that a plurality of normal regions are distributed throughout the coil in response to the quench and the temperature rise in the winding layers adjacent to each of the plurality of heater elements is limited to less than approximately 34 K, wherein each of said normal regions has a large electrical resistance relative to a superconducting region of the coil;
a power supply for charging the coil, said coil storing magnetic energy therein when charged, said stored magnetic energy being dissipated in the heater elements in response to the quench condition, said heater elements further being energized in response to the quench condition to internally dissipate the magnetic energy; and a cold space for maintaining the coil at an operating temperature less than approximately 80 K and greater than approximately 10 K.

23. A method of constructing a superconducting coil, said method comprising:

winding at least one coil of high temperature superconductor, wherein the coil comprises a pancake wound coil;

embedding a plurality of heater elements substantially uniformly throughout the coil according to a predetermined distribution, each of said heater elements being positioned between adjacent coils and substantially in thermal contact with a face of the pancake wound coil adjacent thereto for driving the high temperature superconductor of said winding layers adjacent to each of the plurality of heater elements from a superconducting state into a normal state in response to a quench condition such that a plurality of normal regions are distributed throughout the coil in response to the quench condition, each of said normal regions having a large electrical resistance relative to a superconducting region of the coil, said heater elements further being energized in response to the quench condition, wherein the predetermined distribution of heater elements is a function of a desired volume fraction of the coil being driven into a normal state when the heater elements are activated and wherein the desired volume fraction is at least about 0.15 and the temperature rise in the winding layers adjacent to each of the plurality of heater elements is limited to less than approximately 34 K; and cooling the coil and heating elements to an operating temperature between approximately 10 K and 80 K; and supplying power to the coil for charging the coil, said coil storing magnetic energy therein when charged, said stored magnetic energy being dissipated in the plurality of heater elements in response to the quench condition.

* * * * *

UNITED STATES PATENT AND TRADEMARK OFFICE
CERTIFICATE OF CORRECTION

PATENT NO.        : 7,649,720 B2                                          Page 1 of 1
APPLICATION NO.   : 11/146621
DATED             : January 19, 2010
INVENTOR(S)       : W. Denis Markiewicz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 408 days.

Signed and Sealed this

Twenty-third Day of November, 2010

David J. Kappos
*Director of the United States Patent and Trademark Office*